US010930290B2

(12) United States Patent
Fatus et al.

(10) Patent No.: US 10,930,290 B2
(45) Date of Patent: Feb. 23, 2021

(54) OPTIMIZED CODING AND DECODING OF SPATIALIZATION INFORMATION FOR THE PARAMETRIC CODING AND DECODING OF A MULTICHANNEL AUDIO SIGNAL

(71) Applicant: Orange, Paris (FR)

(72) Inventors: Bertrand Fatus, Le Chesnay (FR); Stephane Ragot, Lannion (FR); Marc Emerit, Rennes (FR)

(73) Assignee: ORANGE, Paris (FR)

( * ) Notice: Subject to any disclaimer, the term of this patent is extended or adjusted under 35 U.S.C. 154(b) by 149 days.

(21) Appl. No.: 16/083,741

(22) PCT Filed: Mar. 10, 2017

(86) PCT No.: PCT/FR2017/050547
§ 371 (c)(1),
(2) Date: Sep. 10, 2018

(87) PCT Pub. No.: WO2017/153697
PCT Pub. Date: Sep. 14, 2017

(65) Prior Publication Data
US 2019/0066701 A1 Feb. 28, 2019

(30) Foreign Application Priority Data
Mar. 10, 2016 (FR) ...................................... 1652034

(51) Int. Cl.
*G10L 13/00* (2006.01)
*G10L 13/02* (2013.01)
(Continued)

(52) U.S. Cl.
CPC ............ *G10L 19/008* (2013.01); *G10L 25/18* (2013.01)

(58) Field of Classification Search
CPC .... G10L 19/22; G10L 19/24; H04R 2201/403
(Continued)

(56) References Cited

U.S. PATENT DOCUMENTS

2007/0016416 A1* 1/2007 Roden .................. G10L 19/008 704/230
2008/0205676 A1* 8/2008 Merimaa .............. G10L 19/008 381/310
(Continued)

OTHER PUBLICATIONS

"Universal Mobile Telecommunications System (UMTS); General audio codec audio processing functions; Enhanced aacPlus general audio codec; General description (3GPP TS 26.401 version 6.2.0 Release 6)." ETSI TS 126 401, V6.2.0. Mar. 2005.
(Continued)

*Primary Examiner* — Akwasi M Sarpong
(74) *Attorney, Agent, or Firm* — David D. Brush; Westman, Champlin & Koehler, P.A.

(57) ABSTRACT

A method of parametric coding of a multichannel digital audio signal including coding a signal arising from a channels reduction processing applied to the multichannel signal and coding spatialization information of the multichannel signal. The method includes the following acts: extraction of a plurality of items of spatialization information of the multichannel signal; obtaining at least one representation model of the extracted spatialization information; determination of at least one angle parameter of a model obtained; coding the at least one determined angle parameter so as to code the spatialization information extracted during the coding of spatialization information. Also provided are a method for decoding such a coded signal and corresponding coding and decoding devices.

12 Claims, 18 Drawing Sheets

(51) Int. Cl.
*G10L 13/033* (2013.01)
*G10L 15/02* (2006.01)
*G10L 19/008* (2013.01)
*G10L 25/18* (2013.01)

(58) Field of Classification Search
USPC .......................................................... 704/500
See application file for complete search history.

(56) References Cited

U.S. PATENT DOCUMENTS

| | | | | |
|---|---|---|---|---|
| 2008/0252510 | A1 | 10/2008 | Jung et al. | |
| 2011/0103591 | A1 | 5/2011 | Ojala | |
| 2011/0103592 | A1* | 5/2011 | Kim | G10L 19/12 381/22 |
| 2011/0153044 | A1* | 6/2011 | Lindahl | G06F 3/167 700/94 |
| 2013/0230176 | A1* | 9/2013 | Virette | G10L 19/008 381/22 |

OTHER PUBLICATIONS

"Information technology—MPEG audio technologies—Part 1: MPEG Surround; Element introductif—Element central—PArtie 1: Titre de la partie." ISO/IEC FDIS 23003-1:2006(E), ISO/IEC JTC 1/SC 29/WG 11. Jul. 21, 2006.
International Search Report dated Jun. 15, 2017 for corresponding International Application No. PCT/FR2017/050547, filed Mar. 10, 2017.
Written Opinion of the International Searching Authority dated Jun. 15, 2017 for corresponding International Application No. PCT/FR2017/050547, filed Mar. 10, 2017.
Li Gao et al. "Azimuthal Perceptual Resolution Model Based Adaptive 3D Spatial Parameter Coding." Network and Parallel Computing; [Lecture Notes in Computer Science; Lect.Notes Computer], Springer International Publishing, Cham, pp. 534-545. Jan. 5, 2015.
Choi et al. "Virtual Sound Rendering in a Stereophonic Loudspeaker Setup." IEEE Transactions on Audio, Speech and Language Processing, IEEE Service Center, New York, NY, USA, vol. 19, No. 7. Sep. 1, 2011.
J. Breebaart et al. "Parametric Coding of Stereo Audio", EURASIP Journal on Applied Signal Processing 2005:9, pp. 1305-1322. 2005.
E. Kurniawati et al. "A Stereo to Mono Downmixing Scheme for MPEG-4 Parametric Stereo Encoder," IEEE ICASSP. 2006.
Ojala et al. "Parametric Binaural Audio Coding", IEEE ICASSP, pp. 393-396. 2010.
Jérôme Daniel. "Représentation de champs acoustiques, application à la transmission et à la reproduction de scènes sonores complexes dans un contexte multimédia" [Representation of acoustic fields, application to the transmission and reproduction of complex sound scenes in a multimedia context], University of Paris 6. Jul. 31, 2001.
"Series G: Transmission Systems and Media, Digital Systems and Networks: Digital terminal equipments—Coding of voice and audio signals; 7kHz Audio—Coding within 64 kbit/s" ITU-T G.722 Telecommunication Standardization Sector of ITU. International Telecommunication Union. Sep. 2012.
"3rd Generation Partnership Project; Technical Specification Group Services and Systems Aspects; Codec for Enhanced Voice Services (EVS); General Overview (Release 15)." 3GPP TS 26.441 V15.0.0. Jun. 2018.
"3rd Generation Partnership Project; Technical Specification Group Services and Systems Aspects; Codec for Enhanced Voice Services (EVS); ANSI C code (fixed-point) (Release 15)." 3GPP TS 26.442 V15.1.0. Dec. 2018.
"3rd Generation Partnership Project; Technical Specification Group Services and Systems Aspects; Codec for Enhanced Voice Services (EVS); ANSI C code (floating-point) (Release 15)." 3GPP TS 26.443 V15.1.0. Dec. 2018.
"3rd Generation Partnership Project; Technical Specification Group Services and Systems Aspects; Codec for Enhanced Voice Services (EVS); Test Sequences (Release 15)." 3GPP TS 26.444 V15.1.0. Dec. 2018.
"3rd Generation Partnership Project; Technical Specification Group Services and Systems Aspects; Codec for Enhanced Voice Services (EVS); Adaptive Multi-Rate—Wideband (AMR-WB) backward compatible functions (Release 15)." 3GPP TS 26.446 V15.0.0. Jun. 2018.
"3rd Generation Partnership Project; Technical Specification Group Services and Systems Aspects; Codec for Enhanced Voice Services (EVS); Error Concealment of Lost Packets (Release 15)." 3GPP TS 26.447 V15.0.0. Jun. 2018.
"3rd Generation Partnership Project; Technical Specification Group Services and Systems Aspects; Codec for Enhanced Voice Services (EVS); Jitter Buffer Management (Release 15)." 3GPP TS 26.448 V15.0.0. Jun. 2018.
"3rd Generation Partnership Project; Technical Specification Group Services and Systems Aspects; Codec for Enhanced Voice Services (EVS); Comfort Noise Generation (CNG) Aspects (Release 15)." 3GPP TS 26.449 V15.0.0. Jun. 2018.
"3rd Generation Partnership Project; Technical Specification Group Services and Systems Aspects; Codec for Enhanced Voice Services (EVS); Discontinuous Transmission (DTX) (Release 15)." 3GPP TS 26.450 V15.0.0. Jun. 2018.
"3rd Generation Partnership Project; Technical Specification Group Services and Systems Aspects; Codec for Enhanced Voice Services (EVS); Voice Activity Detection (VAD) (Release 15)." 3GPP TS 26.451 V15.0.0. Jun. 2018.
"3rd Generation Partnership Project; Technical Specification Group Services and Systems Aspects; Codec for Enhanced Voice Services (EVS); Detailed Algorithmic Description (Release 15)." 3GPP TS 26.445 V15.1.0. Dec. 2018.

* cited by examiner

OPTIMIZED CODING AND DECODING OF SPATIALIZATION INFORMATION FOR THE PARAMETRIC CODING AND DECODING OF A MULTICHANNEL AUDIO SIGNAL

CROSS-REFERENCE TO RELATED APPLICATIONS

This Application is a Section 371 National Stage Application of International Application No. PCT/FR2017/050547, filed Mar. 10, 2017, the content of which is incorporated herein by reference in its entirety, and published as WO 2017/153697 on Sep. 14, 2017, not in English.

FIELD OF THE DISCLOSURE

The present invention relates to the field of the coding/decoding of digital signals.

The coding and the decoding according to the invention is adapted in particular to the transmission and/or the storage of digital signals such as audiofrequency signals (speech, music or other).

More particularly, the present invention pertains to the parametric multichannel coding and decoding of multichannel audio signals.

The invention is therefore concerned with multichannel signals, and in particular with binaural signals which are sound signals recorded with microphones placed at the entrance of the canal of each ear (of a person or of a mannequin) or else synthesized artificially by way of filters known as HRIR (Head-Related Impulse Response) filters in the time domain or HRTF (Head-Related Transfer Function) filters in the frequency domain, which are dependent on the direction and distance of the sound source and the morphology of the subject.

BACKGROUND OF THE DISCLOSURE

Binaural signals are associated with listening typically with a headset or earpiece and exhibit the advantage of representing a spatial image giving the illusion of being naturally in the midst of a sound scene; it therefore entails reproduction of the sound scene in 3D with only 2 channels. It will be noted that it is possible to listen to a binaural sound on loudspeakers by way of complex processings for inverting the HRIR/HRTF filters and for reconstructing binaural signals.

Here we distinguish binaural signals from stereo signals. A stereo signal also consists of two channels but it does not in general allow perfect reproduction of the sound scene in 3D. For example, a stereo signal can be constructed by taking a given signal on the left channel and a zero signal on the right channel, listening to such a signal will give a sound source location on the left but in a natural environment this stratagem is not possible since the signal to the right ear is a filtered version (including a time shift and an attenuation) of the signal to the left ear as a function of the person's morphology.

Parametric multichannel coding is based on the extraction and the coding of spatial-information parameters so that, on decoding, these spatial characteristics can be used to recreate the same spatial image as in the original signal. Examples of codecs based on this principle are found in the 3GPP e-AAC+ or MPEG Surround standards.

The case of parametric stereo coding with N=2 channels is considered here by way of example, insofar as its description is simpler than in the case of N>2 channels.

A parametric stereo coding/decoding technique is for example described in the document by J. Breebaart, S. van de Par, A. Kohlrausch, E. Schuijers, entitled "Parametric Coding of Stereo Audio" in EURASIP Journal on Applied Signal Processing 2005:9, pp. 1305-1322. This example is also employed with reference to FIGS. 1 and 2 describing respectively a parametric stereo coder and decoder.

Thus, FIG. 1 describes a stereo coder receiving two audio channels, a left channel (denoted L for Left in English) and a right channel (denoted R for Right in English).

The temporal signals L(n) and R(n), where n is the integer index of the samples, are processed by the blocks 101, 102, 103 and 104 which perform a short-term Fourier analysis. The transformed signals L[k] and R[k], where k is the integer index of the frequency coefficients, are thus obtained.

The block 105 performs a channels reduction processing or "downmix" in English to obtain in the frequency domain on the basis of the left and right signals, a monophonic signal hereinafter named mono signal. Several techniques have been developed for stereo to mono channel reduction or "downmix" processing. This "downmix" can be performed in the time or frequency domain. One generally distinguishes:

Passive "downmix" which corresponds to a direct matrixing of the stereo channels to combine them into a single signal—the coefficients of the downmix matrix are in general real and of predetermined (fixed) values;

Active (adaptive) "downmix" which includes control of the energy and/or of the phase in addition to the combining of the two stereo channels.

Extraction of spatial-information parameters is also performed in the block 105. The extracted parameters are the following.

The parameters ICLD or ILD or CLD (for "InterChannel/Channel Level Difference" in English), also called differences of interchannel intensity, characterize the ratios of energy per frequency sub-band between the left and right channels. These parameters make it possible to position sound sources in the stereo horizontal plane by "panning". They are defined in dB by the following formula:

$$ICLD[b] = 10.\log_{10}\left\{\frac{\sum_{k=k_b}^{k_{b+1}-1} L[k].L^*[k]}{\sum_{k=k_b}^{k_{b+1}-1} R[k].R^*[k]}\right\}\text{dB} \quad (1)$$

where L[k] and R[k] correspond to the (complex) spectral coefficients of the channels L and R, each frequency band of index b=0, . . . , B−1 comprises the frequency spectral lines in the interval $[k_b, k_{b+1}-1]$, the symbol * indicates the complex conjugate and B is the number of sub-bands.

The parameters ICPD or IPD (for "InterChannel Phase Difference" in English), also called phase differences, are defined according to the following relation:

$$ICPD[b]=\angle(\Sigma_{k=k_b}^{k_{b+1}-1}L[k]\cdot R^*[k]) \quad (2)$$

where ∠ indicates the argument (the phase) of the complex operand. It is also possible to define in an equivalent manner to the ICPD, an interchannel time shift called ICTD or ITD (for "InterChannel Time Difference" in English). The ITD can for example be measured as the delay which maximizes the intercorrelation between L and R:

$$ITD=\max_{-d\leq\tau\leq d}\Sigma_{n=0}^{N-\tau-1}L(n+\tau)\cdot R(n) \quad (3)$$

where d defines the search interval for the maximum. It will be noted that the correlation in equation (3) can be normalized.

In contradistinction to the parameters ICLD, ICPD and ICTD which are location parameters, the parameter ICC (for "InterChannel Coherence" in English) represents the level of inter-channel correlation (or coherence) and is associated with the spatial width of a sound source; the ICC can be defined as:

$$ICC=\max_{-d\leq\tau\leq d}|\Sigma_{n=0}^{N-\tau-1}L(n+\tau)\cdot R(n)| \quad (4)$$

where the correlation can be normalized just as for eq. (3).

It is noted in the article by Breebart et al. that the ICC parameters are not necessary in the sub-bands that are reduced to a single frequency coefficient—indeed the differences of amplitude and of phase completely describe the spatialization in this "degenerate" case.

The ICLD and ICPD parameters are extracted by analysis of the stereo signals, by the block 105. The ICTD or ICC parameters can also be extracted per sub-band on the basis of the spectra L[k] and R[k]; however their extraction is in general simplified by assuming an identical interchannel time shift for each sub-band and in this case a parameter can be extracted on the basis of the temporal channels L(n) and R(n).

The mono signal M[k] is transformed into the time domain (blocks 106 to 108) after short-term Fourier synthesis (inverse FFT, windowing and OverLap-Add or OLA in English) and a mono coding (block 109) is carried out thereafter. In parallel the stereo parameters are quantized and coded in the block 110.

In general the spectrum of the signals (L[k], R[k]) is divided according to a non-linear frequency scale of ERB (Equivalent Rectangular Bandwidth) or Bark type. The parameters (ICLD, ICPD, ICC, ITD) are coded by scalar quantization optionally followed by an entropy coding and/or by a differential coding. For example, in the article cited above, the ICLD is coded by a non-uniform quantizer (ranging from −50 to +50 dB) with differential entropy coding. The non-uniform quantization step exploits the fact that the larger the value of the ICLD the lower the auditory sensitivity to the variations of this parameter.

For the coding of the mono signal (block 109), several quantization techniques with or without memory are possible, for example "Pulse-Code Modulation" (PCM) coding, its version with adaptive prediction termed "Adaptive Differential Pulse-Code Modulation" (ADPCM) or more advanced techniques such as transform-based perceptual coding or "Code Excited Linear Prediction" (CELP) coding or multi-mode coding.

One is concerned here more particularly with the 3GPP EVS (for "Enhanced Voice Services") standard which uses multi-mode coding. The algorithmic details of the EVS codec are provided in the specifications 3GPP TS 26.441 to 26.451 and they are therefore not repeated here. Hereinafter, these specifications will be referred to by the name EVS.

The input signal of the (mono) EVS codec is sampled at the frequency of 8, 16, 32 or 48 kHz and the codec can represent telephone audio bands (narrowband, NB), wide (wideband, WB), super-wide (super-wideband, SWB) or full band (fullband, FB). The bitrates of the EVS codec are divided into two modes:

"EVS Primary":
- fixed bitrates: 7.2, 8, 9.6, 13.2, 16.4, 24.4, 32, 48, 64, 96, 128
- variable bitrate (VBR) mode with a mean bitrate close to 5.9 kbit/s for active speech
- "channel-aware" mode at 13.2 in WB and SWB only "EVS AMR-WB TO" whose bitrates are identical to the AMR-WB 3GPP codec (9 modes)

To this is added the discontinuous-transmission mode (DTX) in which the frames detected as inactive are replaced with SID frames (SID Primary or SID AMR-WB IO) which are transmitted in an intermittent manner, about once every 8 frames.

At the decoder 200, with reference to FIG. 2, the mono signal is decoded (block 201), a decorrelator is used (block 202) to produce two versions $\hat{M}(n)$ and $\hat{M}'(n)$ of the decoded mono signal. This decorrelation, necessary only when the parameter ICC is used, makes it possible to increase the spatial width of the mono source $\hat{M}(n)$. These two signals $\hat{M}(n)$ and $\hat{M}'(n)$ are passed into the frequency domain (blocks 203 to 206) and the decoded stereo parameters (block 207) are used by the stereo synthesis (or shaping) (block 208) to reconstruct the left and right channels in the frequency domain. These channels are finally reconstructed in the time domain (blocks 209 to 214).

An exemplary parametric stereo coding seeking to represent binaural signals (without regard for the nature of the HRTF filters) is described in the article by Pasi Ojala, Mikko Tammi, Miikka Vilermo, entitled "Parametric binaural audio coding", in Proc. ICASSP, 2010, pp. 393-396. Two parameters are coded to restore a spatial image with a location close to a binaural image: the ICLD and the ITD. Moreover a parameter ALC (for "Ambience Level Control" in English) similar to the ICC is also coded, making it possible to control the level of the "ambience" associated with the use of decorrelated channels. This codec is described for signals in the super-wide band with 20-ms frames and a bitrate of 20 or 32 kbit/s to code the mono signal to which is added a bitrate of 5 kbit/s to code the spatial parameters.

Another exemplary parametric stereo codec developed with a specific mode to code binaural signals is given by the standard G.722 Annex D, in particular in the stereo coding mode R1ws in the widened band to 56+8 kbit/s. This codec operates with "short" frames of 5 ms according to 2 modes: a "transient" mode where ICLDs are coded on 38 bits and a "normal" mode where ICLDs are coded on 24 bits with a full-band ITD/IPD on 5 bits. The details of estimating the ITD, of coding the ICLD and ITD parameters are not repeated here. It will be noted that the ICLDs are coded by "decimation" by distributing the coding of the ICLDs over several successive frames, coding only a subset of the parameters of a given frame.

In the two examples it is important to note that one is not dealing with binaural codecs, but with stereo codecs seeking to reproduce a spatial image similar to a binaural signal.

It will be noted that the case of parametric multichannel coding with N>2 follows the same principle as the case N=2, however in general the downmix might not be mono but stereo and the inter-channel parameters must cover more than 2 channels. An exemplary embodiment is given in the MPEG Surround standard where ICLD, ICTD and ICC parameters are coded. It will also be noted that the MPEG Surround decoder includes a binaural restoration, parametrized by HRTF filters.

Let us consider now the case of a stereo coding and decoding of parameters of ICLD type such as is described in FIGS. 1 and 2 and let us take the case of a signal in the widened band, sampled at 16 kHz and analyzed with frames of 20 ms and a sinusoidal windowing covering 40 ms (including 20 ms of "lookahead"). For the extraction of the ICLD parameters (block 105), the spectra L[k] and R[k] may be for example sliced into B frequency sub-bands according to the ERB scale. For each frame, the ICLD of the sub-band b=0, . . . , 34 is calculated according to the equation:

$$ICLD[b] = 10.\log_{10}\left\{\frac{\sigma_L^2[b]}{\sigma_R^2[b]}\right\} \quad (5)$$

where $\sigma_L^2[b]$ and $\sigma_R^2[b]$ represent respectively the energy of the left channel (L[k]) and of the right channel (R[k]):

$$\begin{cases} \sigma_L^2[b] = \sum_{k=k_b}^{k_{b+1}-1} L[k]\cdot L^*[k] \\ \sigma_R^2[b] = \sum_{k=k_b}^{k_{b+1}-1} R[k]\cdot R^*[k] \end{cases} \quad (6)$$

According to the prior art, the coding of a block of 35 ICLD of a given frame can be carried out for example with:

5 bits for the first ICLD parameter (coded in absolute), 4 bits for the following 32 ICLD parameters (coded in differential), 3 bits for the last 2 ICLD parameters (coded in differential).

thus giving a total of 5+32×4+2×3=139 bits/frame, i.e. a bitrate of close to 7 kbit/s in the case of 20-ms frames. This bitrate does not comprise the other parameters.

This bitrate of approximately 7 kbit/s can be reduced on average by using a variable-bitrate entropy coding, for example a Huffman coding; however, in most cases, a drastic bitrate reduction will not be possible.

To halve the bitrate of the coding of the ICLD parameters, it would be possible to use the alternate coding approach described previously in the case of stereo G.722 coding. However, the associated bitrate remains significant for a coding with 35 sub-bands and 20 ms of frame; moreover, the temporal resolution of the coding would be reduced and this may be problematic in the case of non-stationary signals. Another approach would consist in reducing the number of sub-bands to go from 35 to for example 20 sub-bands. This would reduce the bitrate associated with the ICLD parameters, but would in general degrade the fidelity of the synthesized spatial image.

If it is assumed that the coder of FIG. 1 is a stereo coder operating for example at bitrates of 16.4, 24.4, 32, 48, 64, 96, 128 kbit/s and that it relies on a downmix coded by a mono EVS codec, then for the lowest bitrates, for example 16.4 kbit/s in stereo, if the downmix is coded with the mono EVS codec at 13.2 kbit/s, then only 3.2 kbit/s remain to code all the spatial parameters in order to faithfully represent a spatial image. If it is necessary to code not only ICLD parameters, but also other spatial parameters, it is understood that the previously described coding of the ICLD parameters requires too much bitrate.

A need therefore exists to represent the spatial parameters of a multichannel signal in an efficient manner, at as low a bitrate as possible and with acceptable quality.

SUMMARY

The invention improves the situation of the prior art.

For this purpose, it proposes a method of parametric coding of a multichannel digital audio signal comprising a step of coding a signal arising from a channels reduction processing applied to the multichannel signal and of coding spatialization cues in respect of the multichannel signal. The method is such that it comprises the following steps:

extraction of a plurality of spatialization cues in respect of the multichannel signal;

obtaining of at least one representation model of the spatialization cues extracted;

determination of at least one angle parameter of a model obtained;

coding of the at least one determined angle parameter so as to code the spatialization cues extracted during the coding of spatialization cues.

The scheme for coding the spatialization cues relies on a model-based approach which makes it possible to approximate the spatial cues. Thus the coding of a plurality of spatial cues is reduced to the coding of an angle parameter thereby considerably reducing the coding bitrate with respect to the direct coding of the spatial cue. The bitrate required for the coding of this parameter is therefore reduced.

In a particular embodiment based on sub-bands, the spatialization cues are defined by frequency sub-bands of the multichannel audio signal and at least one angle parameter per sub-band is determined and coded.

In a particular embodiment, the method furthermore comprises the steps of calculating a reference spatialization cue and of coding this reference spatialization cue.

Thus, the coding of a reference cue can improve decoding quality. The bitrate for coding this reference cue does not require too significant a bitrate.

This scheme is particularly well suited to the coding of the spatial cue of interchannel time shift (ITD) type and/or of interchannel intensity difference (ILD) type.

To further improve the quality of decoding of the cue of ILD type, the method furthermore comprises the following steps:

estimation of an interchannel intensity difference cue on the basis of the model obtained and of the angle parameter determined;

coding of the difference between the interchannel intensity difference cue extracted and estimated.

The coding of this residual requires an additional coding bitrate but this scheme still affords a gain in bitrate with respect to the direct coding of the ILD spatialization cue.

In a particular embodiment, a spatialization-cue-based representation model is obtained. It can be fixed and stored in memory.

This fixed and recorded model is for example a model of sine form. This type of model is adapted to suit the form of the ITD or ILD cue according to the position of the source.

In a variant embodiment, the obtaining of a representation model of the spatialization cues is performed by selecting from a table of models defined for various values of the spatialization cues.

Several models may be selectable as a function of characteristics of the multichannel signal. This makes it possible to best adapt the spatialization cue model to the signal.

The index of the model chosen can then be in one embodiment, coded and transmitted.

In a variant embodiment a representation model common to several spatialization cues is obtained.

This makes it possible to pool the selection of a model to several spatialization cues, thereby reducing the processing operations to be performed.

The invention also pertains to a method of parametric decoding of a multichannel digital audio signal comprising a step of decoding a signal arising from a channels reduction processing applied to the multichannel and coded signal and of decoding spatialization cues in respect of the multichannel signal. The method is such that it comprises the following steps for decoding at least one spatialization cue:

reception and decoding of at least one coded angle parameter;

obtaining of at least one representation model of spatialization cues;

determination of a plurality of spatialization cues in respect of the multichannel signal on the basis of the at least one model obtained and of the at least one decoded angle parameter.

In the same way as for the coding, this scheme based on the use of a representation model of the spatialization cues makes it possible to retrieve the cue with good quality without it being necessary to have too large a bitrate. At reduced bitrate, a plurality of spatialization cues is retrieved by decoding a simple angle parameter.

In a particular embodiment, the method comprises a step of receiving and decoding an index of table of models and of obtaining the at least one representation model of the spatialization cues to be decoded on the basis of the decoded index.

Thus, it is possible to adapt the model to be used according to the characteristics of the multichannel signal.

The invention pertains to a parametric coder of a multichannel digital audio signal comprising a module for coding a signal arising from a module for channels reduction processing applied to the multichannel signal and modules for coding spatialization cues in respect of the multichannel signal. The coder is such that it comprises:

a module for extracting a plurality of spatialization cues in respect of the multichannel signal;

a module for obtaining at least one representation model of the spatialization cues extracted;

a module for determining at least one angle parameter of a model obtained;

a module for coding the at least one angle parameter determined so as to code the spatialization cues extracted during the coding of spatialization cues.

The coder exhibits the same advantages as the method that it implements.

The invention pertains to a parametric decoder of a multichannel digital audio signal comprising a module for decoding a signal arising from a channels reduction processing applied to the multichannel and coded signal and a module for decoding spatialization cues in respect of the multichannel signal. The decoder is such that it comprises:

a module for receiving and decoding at least one coded angle parameter;

a module for obtaining at least one representation model of the spatialization cues;

a module for determining a plurality of spatialization cues in respect of the multichannel signal on the basis of the at least one model obtained and of the at least one decoded angle parameter.

The decoder exhibits the same advantages as the method that it implements.

Finally, the invention pertains to a computer program comprising code instructions for the implementation of the steps of a coding method according to the invention, when these instructions are executed by a processor, to a computer program comprising code instructions for the implementation of the steps of a decoding method according to the invention, when these instructions are executed by a processor.

The invention pertains finally to storage medium readable by a processor on which is recorded a computer program comprising code instructions for the execution of the steps of the coding method such as described and/or of the decoding method such as described.

BRIEF DESCRIPTION OF THE DRAWINGS

Other characteristics and advantages of the invention will become more clearly apparent on reading the following description, given solely by way of nonlimiting example and with reference to the appended drawings in which.

DETAILED DESCRIPTION OF ILLUSTRATIVE EMBODIMENTS

Figure 1:
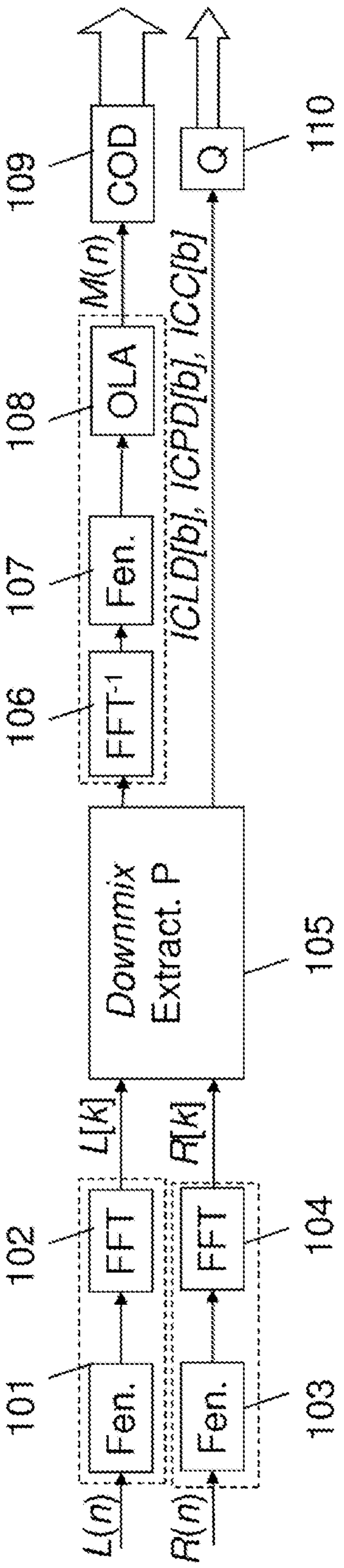
Fig.1 (Prior Art)
FIG. 1 illustrates a coder implementing a parametric coding known from the prior art and described previously.
Figure 2:
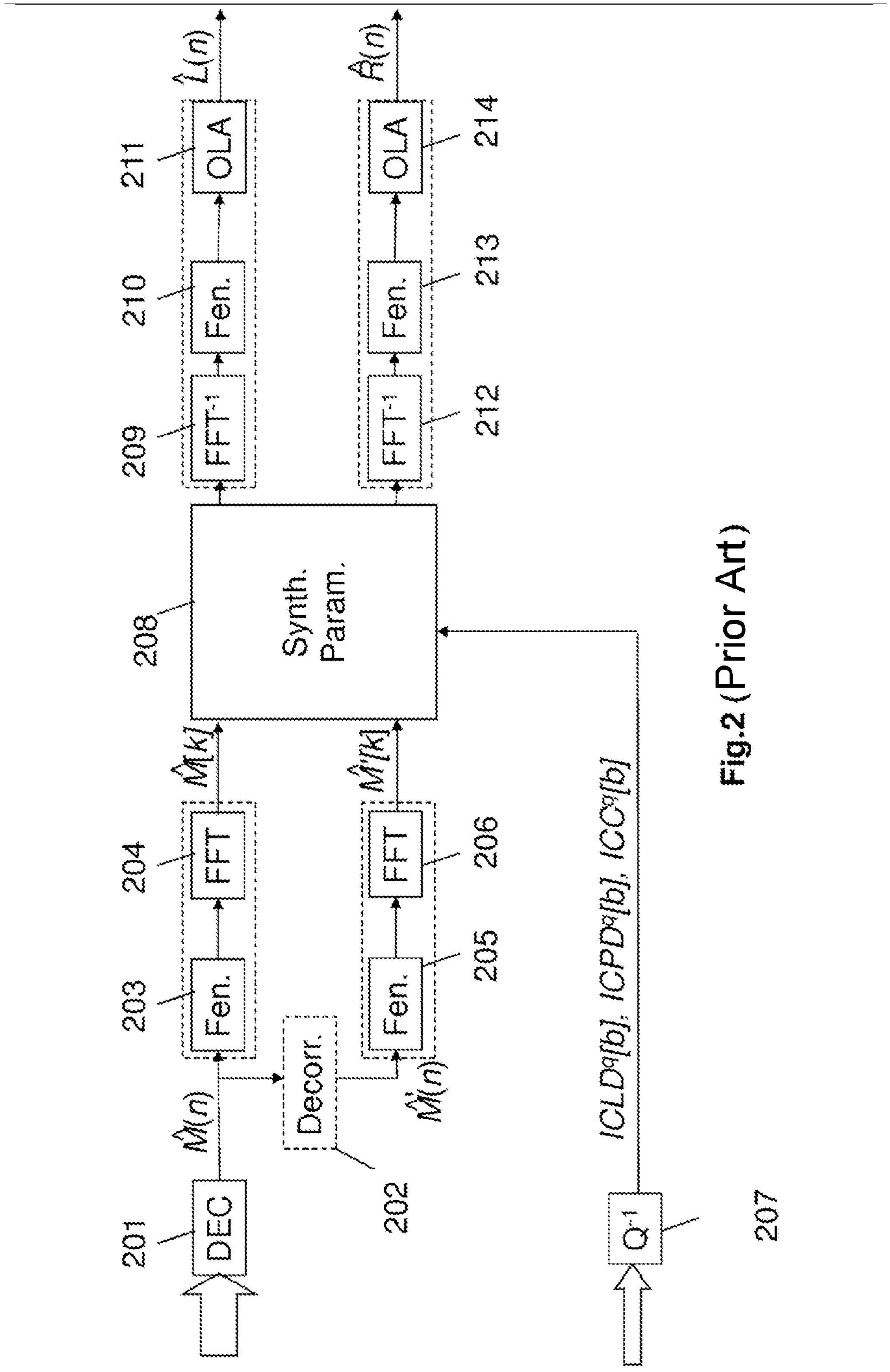
Fig.2 (Prior Art)
FIG. 2 illustrates a decoder implementing a parametric decoding known from the prior art and described previously.
Figure 3:
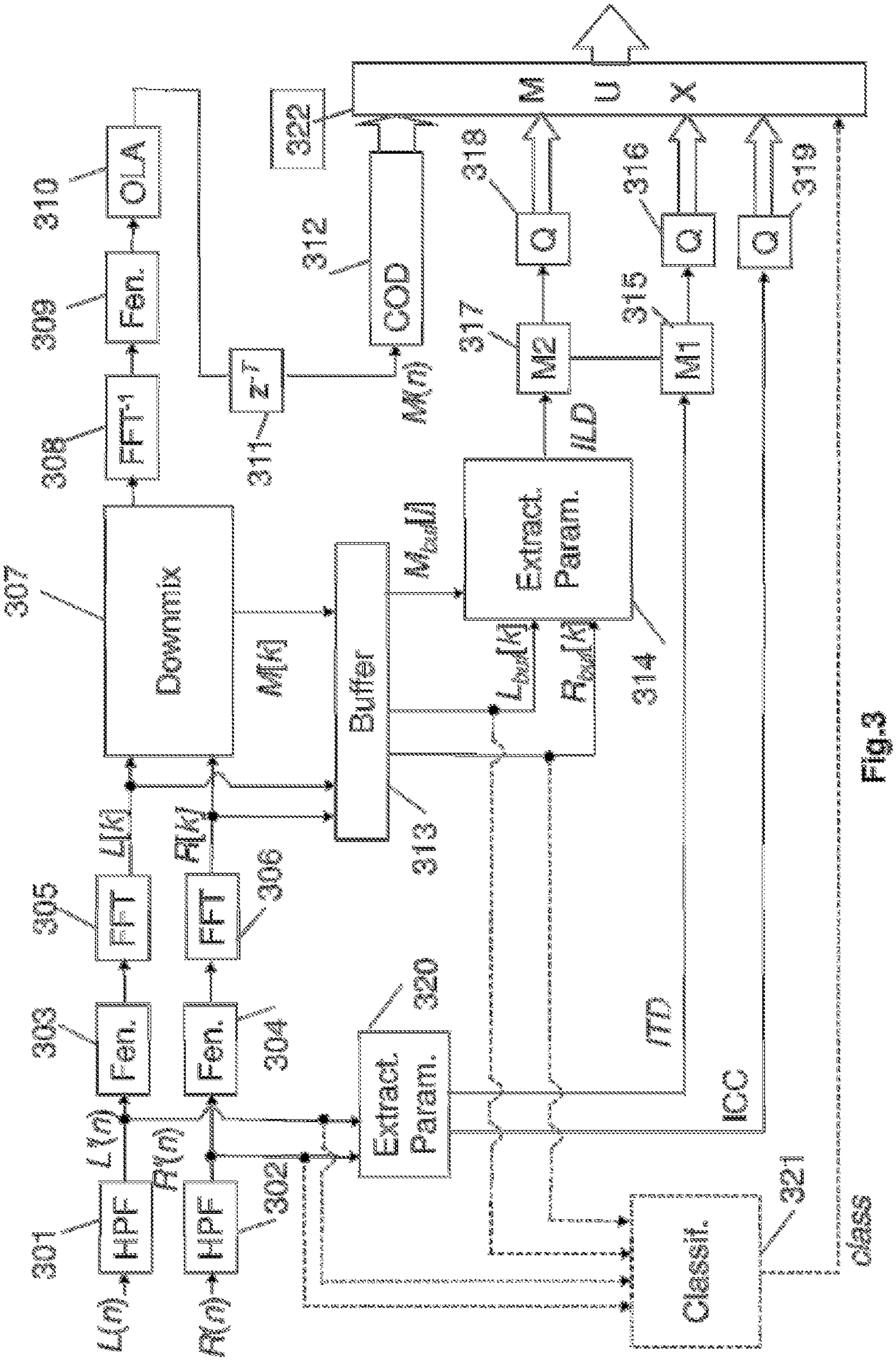
FIG. 3 illustrates a parametric coder according to one embodiment of the invention.

With reference to FIG. 3, a parametric coder of signals with two channels according to one embodiment of the invention, delivering both a mono binary train and spatial-information parameters in respect of the input signal is now described. This figure presents at one and the same time the entities, hardware or software modules driven by a processor of the coding device and the steps implemented by the coding method according to one embodiment of the invention.

The case of a signal with two channels is described here. The invention also applies to the case of a multichannel signal with a number of channels greater than 2.

To avoid overburdening the text, the coder described in FIG. 3 will be called a "stereo coder" even if it allows the coding of binaural signals. Likewise the parameters ICLD, ICTD, ICPD will be respectively denoted ILD, ITD, IPD even if the signal is not binaural.

This parametric stereo coder such as illustrated uses an EVS mono coding according to the specifications 3GPP TS 26.442 (fixed-point source code) or TS 26.443 (floating-point source code), it operates with stereo or multichannel signals sampled at the sampling frequency $F_s$ of 8, 16, 32 and 48 kHz, with 20-ms frames. Hereinafter, with no loss of generality, the description is given mainly for the case $F_s$=16 kHz and for the case N=2 channels.

It should be noted that the choice of a frame length of 20 ms is not in any case restrictive in the invention which applies likewise in variants of the embodiment where the frame length is different, for example 5 or 10 ms, with a codec other than EVS.

Moreover, the invention applies likewise to other types of mono coding (e.g.: IETF OPUS, UIT-T G.722) operating at identical or non-identical sampling frequencies.

Each temporal channel (L'(n) and R(n)) sampled at 16 kHz is firstly pre-filtered by a high-pass filter (HPF for High Pass Filter in English) typically eliminating the components below 50 Hz (blocks 301 and 302). This pre-filtering is optional, but it can be used to avoid the bias due to the continuous component (DC) in the estimation of parameters such as the ICTD or the ICC.

The channels L'(n) and R'(n) arising from the pre-filtering blocks are analyzed in terms of frequencies by discrete Fourier transform with sinusoidal windowing with overlap of 50% of length 40 ms i.e. 640 samples (blocks 303 to 306). For each frame, the signal (L'(n), R'(n)) is therefore weighted by a symmetric analysis window covering 2 frames of 20 ms i.e. 40 ms (or 640 samples for $F_s$=16 kHz). The 40-ms analysis window covers the current frame and the future frame. The future frame corresponds to a "future" signal segment commonly called "lookahead" of 20 ms. In variants of the invention, other windows could be used, for example a low-delay asymmetric window called "ALDO" in the EVS codec. Moreover, in variants, the analysis windowing could be rendered adaptive as a function of the current frame, so as to use an analysis with a long window on stationary segments and an analysis with short windows on transient/non-stationary segments, optionally with transition windows between long and short windows.

For the current frame of 320 samples (20 ms at $F_s$=16 kHz), the spectra obtained, L[k] and R[k] (k=0 . . . 320), comprise 321 complex coefficients, with a resolution of 25 Hz per frequency coefficient. The coefficient of index k=0 corresponds to the continuous component (0 Hz), it is real. The coefficient of index k=320 corresponds to the Nyquist frequency (8000 Hz for $F_s$=16 kHz), it is also real. The coefficients of index 0<k<160 are complex and correspond to a sub-band of width 25 Hz centered on the frequency of k.

The spectra L[k] and R[k] are combined in the block 307 to obtain a mono signal (downmix) M[k] in the frequency domain. This signal is converted into time by inverse FFT and windowing-overlap with the "lookahead" part of the previous frame (blocks 308 to 310).

An example of frequency "downmix" technique is described in the document entitled "A stereo to mono downmixing scheme for MPEG-4 parametric stereo encoder" by Samsudin, E. Kurniawati, N. Boon Poh, F. Sattar, S. George, in Proc. ICASSP, 2006. In this document, the L and R channels are aligned in phase before performing the channels reduction processing.

More precisely, the phase of the L channel for each frequency sub-band is chosen as the reference phase, the R channel is aligned according to the phase of the L channel for each sub-band through the following formula:

$$R'[k]=e^{j\cdot ICPD[b]}R[k] \tag{7}$$

where R'[k] is the aligned R channel, k is the index of a coefficient in the $b^{th}$ frequency sub-band, ICPD[b] is the inter-channel phase difference in the $b^{th}$ frequency sub-band given by equation (2).

Note that when the sub-band of index b is reduced to a frequency coefficient, we find:

$$R'[k]=|R[k]|\cdot e^{j\angle L[k]} \tag{8}$$

Finally the mono signal obtained by the "downmix" of the document of Samsudin et al. cited previously is calculated by averaging the L channel and the aligned R' channel, according to the following equation:

$$M[k]=\frac{L[k]+R'[k]}{2} \tag{9}$$

The phase alignment therefore makes it possible to preserve the energy and to avoid the problems of attenuation by eliminating the influence of the phase. This "downmix" corresponds to the "downmix" described in the document by Breebart et al. where:

$$M[k]=w_{1L[k]+}w_{2R[k]} \tag{10}$$

with $w_1$=0.5 and $$w_2=\frac{e^{j\cdot ICPD[b]}}{2}$$

in the case where the sub-band of index b comprises only a frequency value of index k.

Other "downmix" schemes can of course be chosen without modifying the scope of the invention.

The algorithmic delay of the EVS codec is 30.9375 ms at $F_s$=8 kHz and 32 ms for the other frequencies $F_s$=16, 32 or 48 kHz. This delay includes the current frame of 20 ms, the additional delay with respect to the frame length is therefore 10.9375 ms at $F_s$=8 kHz and 12 ms for the other frequencies (i.e. 192 samples at $F_s$=16 kHz), the mono signal is delayed (block 311) by T=320−192=128 samples so that the delay accumulated between the mono signal decoded by EVS and the original stereo channels becomes a multiple of the length of frames (320 samples). Accordingly, to synchronize the extraction of stereo parameters (block 314) and the spatial synthesis on the basis of the mono signal performed at the decoder, the lookahead for the calculation of the mono signal (20 ms) and the mono coding/decoding delay to which is added the delay T to align the mono synthesis (20 ms) correspond to an additional delay of 2 frames (40 ms) with respect to the current frame. This delay of 2 frames is specific to the implementation detailed here, in particular it is related to the 20-ms sinusoidal symmetric windows. This delay could be different. In a variant embodiment, it would be possible to obtain a delay of a frame with an optimized window with a smaller overlap between adjacent windows with a block 311 not introducing any delay (T=0).

The shifted mono signal is thereafter coded (block 312) by the mono EVS coder for example at a bitrate of 13.2, 16.4 or 24.4 kbit/s. In variants, the coding could be performed directly on the unshifted signal; in this case the shift could be performed after decoding.

In a particular embodiment of the invention, illustrated here in FIG. 3, it is considered that the block 313 introduces a delay of two frames on the spectra L[k], R[k] and M[k] so as to obtain the spectra $L_{buf}$[k], $R_{buf}$[k] and $M_{buf}$[k].

It would be possible in a more advantageous manner in terms of quantity of data to be stored, to shift the outputs of the parameters extraction block 314 or else the outputs of the quantization blocks 318, 316 and 319. It would also be possible to introduce this shift at the decoder on receiving the binary train of the stereo coder.

In parallel with the mono coding, the coding of the spatial cue is implemented in the blocks 315 to 319 according to a coding method of the invention. Moreover, the coding comprises an optional step of classifying the input signal in the block 321.

This classification block, according to the multichannel signal to be coded, can make it possible to pass from one mode of coding to another. One of the coding modes being that implementing the invention for the coding of the spatialization cues. The other coding modes are not detailed here, but it will be possible to use conventional techniques for stereo or multichannel coding, including techniques for parametric coding with ILD, ITD, IPD, ICC parameters. The classification is indicated here with the L and R temporal signals as input, optionally the signals in the frequency domain and the stereo or multichannel parameters will also be able to serve for the classification. It will also be possible to use the classification to apply the invention to a given spatial parameter (for example to code the ITD or the ILD), stated otherwise to switch the type of coding of spatial parameters with a possible choice between a coding scheme according to a model as in the invention or an alternative coding scheme of the prior art.

The spatial parameters are extracted (block 314) on the basis of the spectra L[k], R[k] and M[k] shifted by two frames: $L_{buf}$[k], $R_{buf}$[k] and $M_{buf}$[k] and coded (blocks 315 to 319) according to a coding method described with reference to FIGS. 4*a* to 4*c* and detailing the blocks 315 and 317.

For the extraction of the parameters ILD (block 314), the spectra $L_{buf}$[k] and $R_{buf}$[k] are for example sliced into frequency sub-bands.

In one embodiment, a 1/3 octave sub-band slicing defined in array 1 hereinbelow will be taken:

In variants, it will be possible to use another sub-band slicing, for example according to the ERB scale; in this case, it will be possible to use B=35 sub-bands, the latter are defined by the following boundaries in the case where the input signal is sampled at 16 kHz:

$k_{b=0\ldots35}$=[0 1 2 3 5 6 8 10 12 14 17 20 23 27 31 35 40 52 58 66 74 83 93 104 117 130 145 162 181 201 224 249 277 307 320]

The above array delimits (as index of Fourier spectral lines) the frequency sub-bands of index b=0 to B−1. For example the first sub-band (b=0) goes from the coefficient $k_b$=0 to $k_{b+1}$−1=0; it is therefore reduced to a single coefficient which represents 25 Hz. Likewise, the last sub-band (k=34) goes from the coefficient $k_b$=307 to $k_{b+1}$−1=319, it comprises 12 coefficients (300 Hz). The frequency spectral line of index k=320 which corresponds to the Nyquist frequency is not taken into account here.

For each frame, the ILD of the sub-band b=0, . . . , B−1 is calculated according to equations (5) and (6) repeated here:

$$ILD[b] = 10 \cdot \log_{10}\left\{\frac{\sigma_L^2[b]}{\sigma_R^2[b]}\right\} \tag{11}$$

where $\sigma_L^2$[b] and of $\sigma_R^2$[b] represent respectively the energy of the left channel ($L_{buf}$[k]) and of the right channel ($R_{buf}$[k]):

$$\begin{cases} \sigma_L^2[b] = \sum_{k=k_b}^{k_{b+1}-1} L[k] \cdot L^*[k] \\ \sigma_R^2[b] = \sum_{k=k_b}^{k_{b+1}-1} R[k] \cdot R^*[k] \end{cases} \tag{12}$$

According to a particular embodiment, the parameters ITD and ICC are extracted in the time domain (block 320). In variants of the invention these parameters could be extracted in the frequency domain (block 314), this not

| No Octave Thirds | 1 | 2 | 3 | 4 | 5 | 6 | 7 | 8 | 9 | 10 | 11 | 12 |
|---|---|---|---|---|---|---|---|---|---|---|---|---|
| Base frequency (Hz) | 0 | 111 | 140 | 177 | 223 | 281 | 354 | 445 | 561 | 707 | 891 | 1122 |
| High Frequency (Hz) | 111 | 140 | 177 | 223 | 281 | 354 | 445 | 561 | 707 | 891 | 1122 | 1414 |
| **No Octave Thirds** | **13** | **14** | **15** | **16** | **17** | **18** | **19** | **20** | **21** | **22** | **23** | **24** |
| Base frequency (Hz) | 1414 | 1782 | 2245 | 2828 | 3564 | 4490 | 5657 | 7127 | 8980 | 11314 | 14254 | 17959 |
| High Frequency (Hz) | 1782 | 2245 | 2828 | 3564 | 4490 | 5657 | 7127 | 8980 | 11314 | 14254 | 17959 | 22627 |

Array 1

This array covers all the cases of sampling frequency, for example for a coder with a sampling frequency at 16 kHz only the first B=20 sub-bands will be retained. Thus, it will be possible to define the array:

$k_{b=0\ldots20}$=[0 4 6 7 9 11 14 18 22 28 36 45 57 71 90 113 143 180 226 285 320]

The above array delimits (as index of Fourier spectral lines) the frequency sub-bands of index b=0 to B−1 for the case $F_s$=16 kHz. Each sub-band of index b comprises the coefficients $k_b$=0 to $k_{b+1}$−1. The frequency spectral line of index k=320 which corresponds to the Nyquist frequency is not taken into account here.

being represented in FIG. 3 so as not to overburden the figure. An exemplary embodiment of the estimation of the ITD in the frequency domain is given in the standard UIT-T G.722 Annex D on the basis of the smoothed product L[k]. R*[k].

In one embodiment the parameters ITD and ICC are estimated in the following manner. The ITD is sought by intercorrelation according to equation (3) repeated here:

$$ITD = \max_{-d \le \tau \le d} \sum_{n=0}^{N-\tau-1} L(n+\tau) \cdot R(n) \tag{13}$$

with for example d=630 μs×$F_s$, i.e. 10 samples at16 kHz. This value of 630 μs is obtained for the binaural case, on the basis of Woodworth's law defined hereinafter, with a spherical approximation of the head (with a mean radius a=8.5 cm) and an azimuth $\theta=\pi/2$.

The ITD obtained according to equation (3) is thereafter smoothed to attenuate its temporal variations. The benefit of the smoothing is to attenuate the fluctuations of the instantaneous ITD which may degrade the quality of the spatial synthesis at the decoder. The smoothing scheme adopted lies outside the scope of the invention and it is not detailed here.

During the calculation of the ITD, the ICC is also calculated according to equation (4) defined hereinabove.

The spatial parameters or cues ILD and ITD are coded according to a scheme forming the subject of the invention and described with reference to FIGS. 4*a* to 4*c* which detail the blocks 315 and 317 of FIG. 3 according to various embodiments of the invention.

These blocks 315 and 317 implement schemes based on models of respective representations of the cues ITD and ILD.

Certain parameters of the respective models obtained on output from the blocks 315 and 317 are thereafter coded at 316 and 318 for example according to a scalar quantization scheme.

All the spatialization cues thus coded are multiplexed by the multiplexer 322 before being transmitted.

Figure 5A:
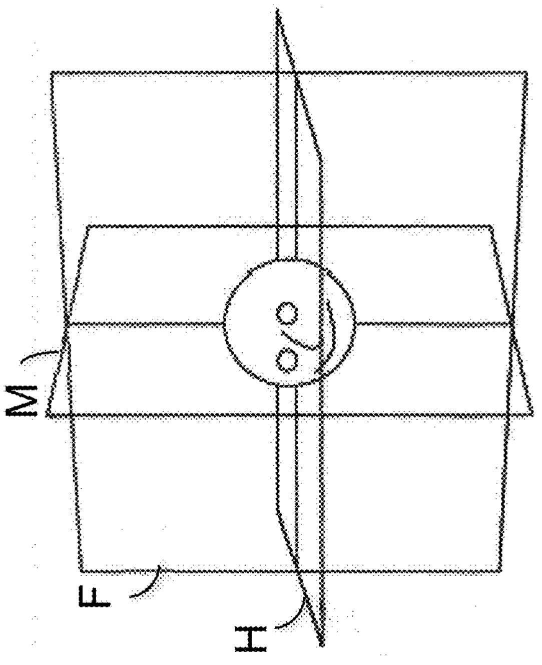
FIGS. 5*a*, 5*b* illustrate the notions of sound perception in 3D and 2D
Figure 5B:
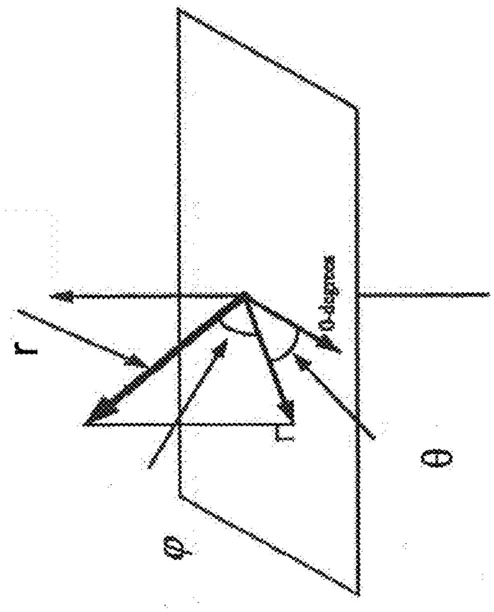

Certain significant notions about sound perception are recalled in FIGS. 5*a* and 5*b*. In FIG. 5*a* is illustrated a median plane M, a frontal plane F and a horizontal plane H, with respect to the head of a listener. Sound perception allows 3D location of a sound source, this location is typically identified by spherical coordinates (r, θ, φ) according to FIG. 5*b*; in the case of a stereo signal, perception occurs on a horizontal plane and in this case polar coordinates (r, θ) suffice to locate the source in 2D. It is also recalled that a stereo signal allows reproduction only on a line between 2 loudspeakers on the horizontal plane, whilst a binaural signal normally allows perception in 3D.

In one embodiment it is considered that the signal comprises a sound source situated in the horizontal plane.

Figure 5C:
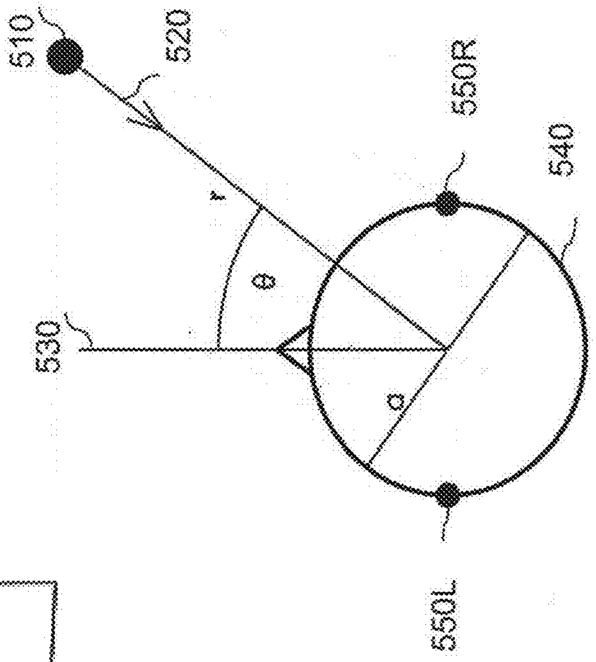
FIG. 5*c* illustrates a schematic representation of polar coordinates (distance, azimuth) of an audio source in the horizontal plane with respect to a listener, in the binaural case.

In the case of a binaural signal, it may be useful to define the position of a virtual source associated with the multichannel signal to be coded. As illustrated in FIG. 5*c*, if one considers only the case of a sound source 510 situated in the horizontal plane (2D) around the person represented by a head approximated by a sphere at 540, the position of the source is specified by the polar coordinates (r, θ).

The angle θ is defined between the frontal axis 530 of the listener and the axis of the source 520. The two ears of the listener are represented as 550R for the right ear and as 550L for the left ear. The cue in respect of time shift between the two channels of a binaural signal is associated with the interaural time difference, that is to say the difference in time that a sound takes to arrive at the two ears. If the source is directly in front of the listener, the wave arrives at the same moment at both ears and the ITD cue is zero.

The interaural time difference (ITD) can be simplified by using a geometric approximation in the form of the following sine law:

$$ITD(\theta)=a\sin(\theta)/c \tag{14}$$

where θ is the azimuth in the horizontal plane, a is the radius of a spherical approximation of the head and c the speed of sound (in $m \cdot s^{-1}$) which can be defined as $c=343\ m \cdot s^{-1}$. This law is independent of frequency, and it is known to give good results in terms of spatial location.

A virtual sound source can therefore be located with an angle θ and the ITD cue can be deduced through the following formula:

$$ITD(\theta)=ITD_{max}\sin(\theta) \tag{15}$$

where $$ITD_{max=a/c} \tag{16}$$

The value given to $ITD_{max}$ may for example correspond to 630 μs, which is the limit of perceptual separation between two pulses. For larger values of ITD the subject will hear two different sounds and will not be able to interpret the sounds as a single sound source.

In variants of the invention the sine law could be replaced with Woodworth's ITD model defined in the work by R. S Woodworth, Experimental Psychology (Holt, N.Y.), 1938, pp. 520-523, by the following equation:

$$ITD(\theta)=a(\sin(\theta)+\theta)/c \tag{17}$$

which is valid for a far field (typically a source at a distance of at least 10. a). Employing the principle of normalization by a maximum value $ITD_{max}$ as in equation (15), the ITD model according to Woodworth's law can be written in the form:

$$ITD(\theta)=\frac{ITD_{max}(\sin(\theta)+\theta)}{1+\pi/2} \tag{18}$$

where $$ITD_{max}=a(1+\pi/2)/c \tag{19}$$

In variants, it would be possible to define a multiplicative factor which does not represent the maximum value of the ITD but a proportional value for example the factor a/c. The invention also applies in this case. For example, to simplify the expression for Woodworth's law it is possible to write:

$$ITD(\theta)=ITD_{max}(\sin(\theta)+\theta) \tag{20}$$

where $$ITD_{max=a/c} \tag{21}$$

In this case the value of $ITD_{max}$ does not represent the maximum value of the ITD. Hereinafter, this "disparity of notation" will be used.

Figure 4A:
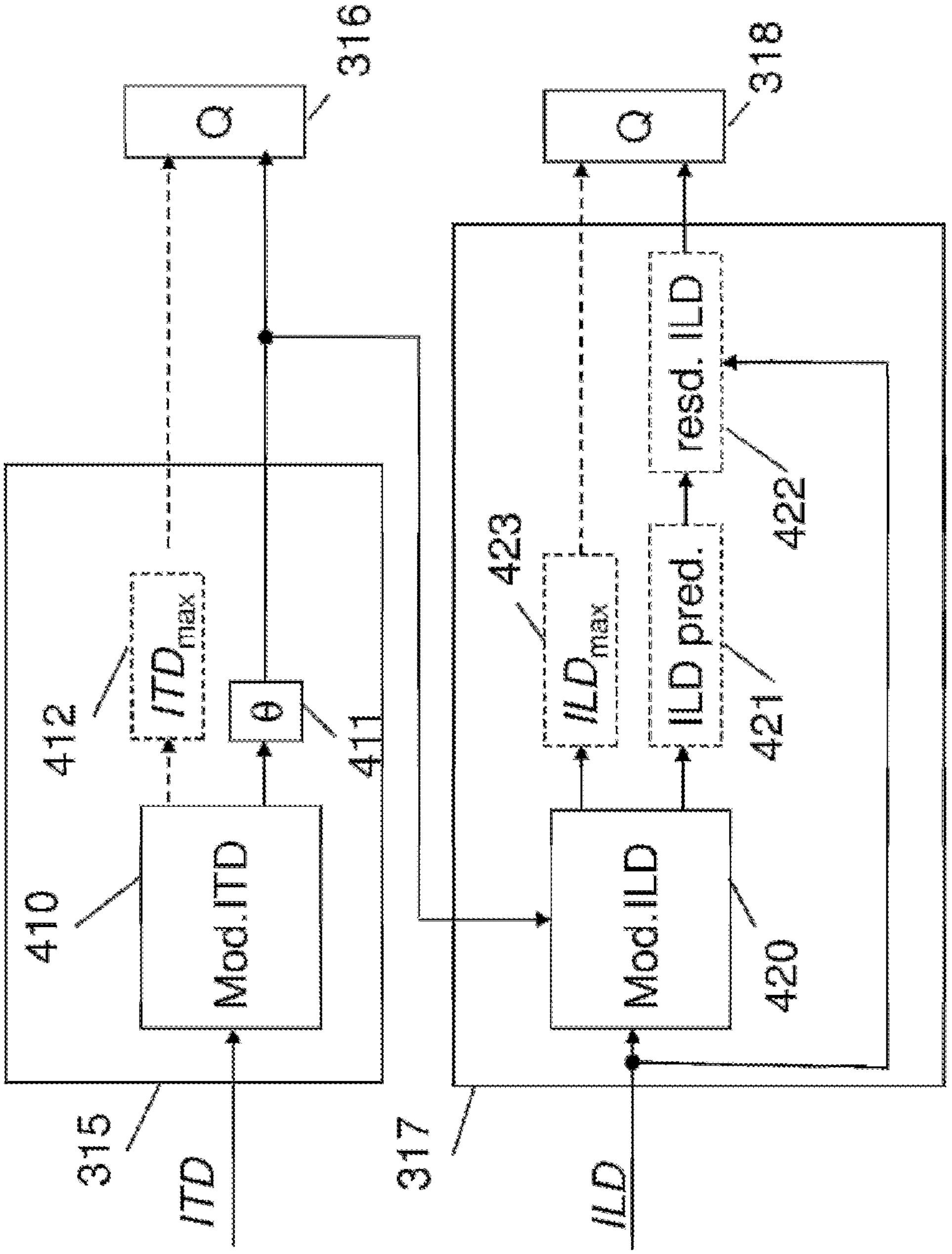
FIGS. 4*a*, 4*b* and 4*c* illustrate the steps of the coding method according to various embodiments of the invention by a detailed illustration of the blocks for coding spatial cues.

Thus, with reference to FIG. 4*a*, the block 315 which receives an interchannel time shift (ITD) cue through the extraction module 320 comprises a module 410 for obtaining a representation model of the interchannel time shift cue.

This model is for example the model such as defined hereinabove in equation (15) with a value $ITD_{max}$=630 μs predefined in the model or the model of equation (20).

In variants, the value $ITD_{max}$ could be rendered flexible by coding either this value directly, or by coding the difference between this value and a predetermined value. This approach makes it possible in fact to extend the application of the ITD model to more general cases, but its drawback is to require additional bitrate. To indicate that the explicit coding of the value $ITD_{max}$ is optional, the block 412 appears dashed in FIG. 4*a*.

A module 411 for determining the angle θ such as defined hereinabove is implemented to obtain the angle defined by the sound source. More precisely this module searches for the azimuth parameter θ which makes it possible to approach as close as possible to the ITD extracted. When the law is known as in equation (15), this angle can be obtained in an analytical manner:

$$\theta = a\ \sin(ITD/ITD_{max}) \quad (22)$$

In variants, the a sin function could be approximated.

An equivalent approach for determining the azimuth can be implemented in the block 411. According to this approach, the determination of the angle θ for the sine law calls upon a search with the aid of the ITD model, for the closest value as a function of the possible values of azimuth:

$$\theta = arg\ \min_{\theta \in T}(ITD - ITD_{max}\sin(\theta))^2 \quad (23)$$

This search can be performed by pre-storing the various candidate values of $ITD_{max}\cdot\sin(\theta)$ arising from the ITD model in a table $M_{ITD}$ for a search interval which may be $T=[-\pi/2,\pi/2]$ assuming that the ITD is symmetric when the source is in front of or behind the subject. In this case, the values of θ are discretized, for example with a step size of 1° over the search interval.

In the case of Woodworth's law, it is also possible to follow the same approach as hereinabove for the sine law. The analytical expression for the inverse function of sin (θ)+θ not being trivial, it will be possible to prefer the search:

$$\theta = arg\ \min_{\theta \in T}(ITD - ITD_{max}(\sin(\theta)+\theta))^2 \quad (24)$$

The angle parameter θ determined in the block 411 is thereafter coded according to a conventional coding scheme for example by scalar quantization on 4 bits by the block 316. This block carries out a search for the quantization index $$i = \mathrm{argmin}_{j=0, \ldots ,15}(\theta - Q_\theta[j])^2 \quad (25)$$

where the table is given for the case of a uniform scalar quantization on 4 bits $$Q_\theta = \left\{-\pi, -\frac{7\pi}{8}, \ldots , 0, \frac{\pi}{8}, \ldots , \frac{7\pi}{8}\right\} \quad (26)$$

In variants, the number of bits allocated to the coding of the azimuth could be different, and the quantization levels could be non-uniform to take account of the perceptual limits of location of a sound source according to the azimuth.

It is the coding of this parameter which makes it possible to code the time shift cue ITD, optionally with the coding of $ITD_{max}$ (block 412) as additional cue if the value predetermined by the ITD model must be adapted. The spatialization cue will therefore be retrieved on decoding by decoding the angle parameter, optionally by decoding $ITD_{max}$, and by applying the same representation model of the ITD. The bitrate necessary for coding this angle parameter is low (for example 4 bits per frame) when no correction of the value $ITD_{max}$ predefined in the model is coded. Thus, the coding of this spatialization cue (ITD) consumes little bitrate.

At very low bitrate, the coding of a single angle θ can be implemented to code the spatialization cue in respect of a binaural signal.

In a variant embodiment, it will be possible to estimate an ITD per frequency band, for example by taking a slicing into B sub-bands, defined previously. In this case, an angle θ per frequency band is coded and transmitted to the decoder, which for the example of B sub-bands gives B angles to be transmitted.

In another variant, it will be possible to ignore the estimation of the ITD for certain high frequency bands for which the phase differences are not perceptible. Likewise, it will be possible to omit the estimation of the ITD for very low frequencies. For example, the ITD will not be able to be estimated for bands above 1 kHz, and for a sub-band slicing as defined previously it will be possible to retain the bands b=0 to 11 in the embodiment using the 1/3 octave and 1 to 16 in the variants using the ERB scale (the first band b=0 being omitted in the latter case since it entails frequencies below 25 Hz). In variants of the invention, a sub-band slicing with a different resolution from 25 Hz could be used; it will thus be possible to group together certain sub-bands since the 1/3 octave slicing or the ERB scale may be too fine for the coding of the ITD. This avoids coding too many angles per frame. For each frequency band, the ITD is thereafter converted into an angle as in the case of a single angle described hereinabove with a bit allocation which can be either fixed or variable as a function of the significance of the sub-band. In all these variants where several angles are determined and coded, a vector quantization could be implemented in the block 316.

Figure 4B:
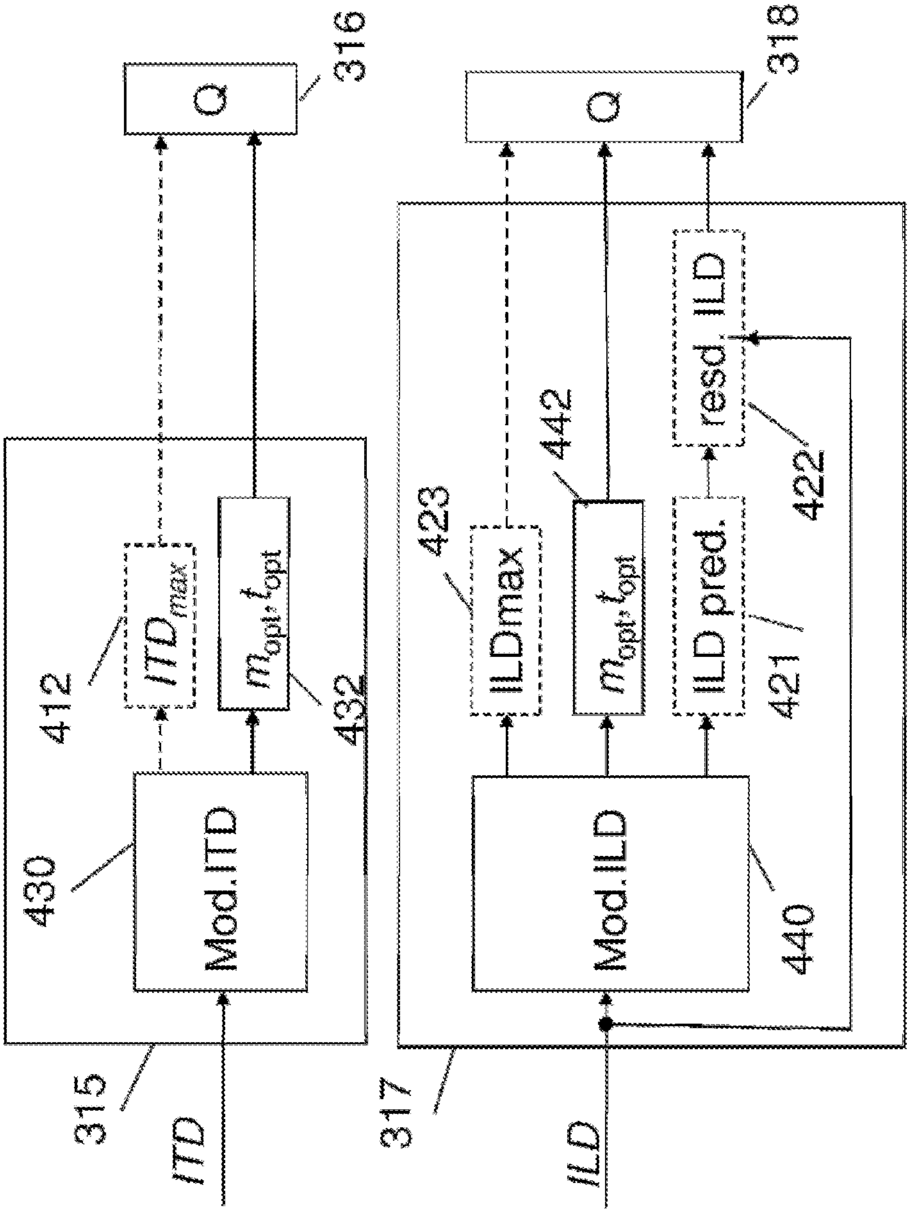

FIG. 4*b* represents a variant embodiment of the invention which can replace the mode described in FIG. 4*a*. The principle of this variant is to combine in particular the blocks 411 and 316 into a block 432.

In this variant embodiment, one considers the definition of several "competing" models for coding the ITD, knowing that the invention also applies when a single ITD model is defined.

Thus, the model such as defined for the interchannel time shift (ITD) cue might not be fixed and be parametrizable. Each model defines a set of values of ITD as a function of an angle parameter: the sine law and Woodworth's law constitute two examples of models. In this variant, for coding, a model index and an angle index (also called angle parameter) to be coded are determined in the block 432 on the basis of an ITD models table obtained at 430 according to the following equation:

$$(m_{opt}, t_{opt}) = \mathrm{argmin}_{\substack{m=0, \ldots ,N_M-1 \\ t=0, \ldots , N_\theta(m)-1}} (ITD - M_{ITD}(m, t))^2 \quad (27)$$

where $N_M$ is the number of models in the ITD models table, $N_\theta(m)$ is the number of azimuth angles considered for the m-th model and $M_{ITD}(m, t)$ corresponds to a precise value of the cue ITD.

An exemplary model $M_{ITD}(m, t)$ is given hereinbelow in the case of a model of index m=0 according to a Woodworth law as in equation 20 with $ITD_{max}$=0.2551 ms:

$$M_{ITD}(m=1, t=0 \ldots 7) = [-0.5362\ -0.3807\ -0.1978\ 0\ 0.1978\ 0.3807\ 0.5362\ 0.6558]$$

where each value is in ms. The angle index t corresponds in fact to an angle θ covering the interval $$\left]-\frac{\pi}{2}, \frac{\pi}{2}\right]$$

with a step size of $$\frac{\pi}{8}.$$

This table can also be referred to samples for example in the case of a sampling at 16 kHz, one obtains in an equivalent manner:

$$M_{ITD}(m=1,t=0\ldots 7)=[-8.5795\ -6.0919\ -3.1648\ 0\ 3.1648\ 6.0919\ 8.5795\ 10.4930]$$

In this case, $N_\theta(m)=8$ and $N_M=1$. It is therefore possible to code the cue ITD on 3 bits with this single model.

It will be noted that for a given model index m, the model $M_{ITD}(m, t)$ is implicitly dependent on the azimuth angle, insofar as the index t in fact represents a quantization index for the angle θ. Thus, the model $M_{ITD}(m, t)$ is an efficient means of combining the relation between ITD and θ, and the quantization of θ on $N_\theta(m)$ levels, and of potentially using several models (at least one), indexed by $m_{opt}$ when more than one model is used.

In one embodiment the case of two different models is for example considered:

m=0: A binaural model previously defined with Woodworth's law with ITD $(\theta)=ITD_{max}(\sin(\theta)+\theta)$ and $ITD_{max}=10$ (samples at 16 kHz) m=1: A model according to a sine law as in equation (15) but for a mic A-B (2 omnidirectional microphones separated by a distance a). The sine law applies here also, only the parameter α depends on the distance between the microphones:

$$ITD(\theta)=ITD_{max}\sin(\theta) \text{ and } ITD_{max}=30 \text{(samples at16 kHz)}$$

It will be noted that the size $N_\theta(m)$ may be identical for all the models, but in the general case it is possible for different sizes to be used. For example it will be possible to define $N_\theta(m)=16$ and $N_M=2$. It is therefore possible to code the cue ITD on 4+1=5 bits.

An index of the selected law $m_{opt}$ is then coded on $[\log_2 N_M]$ bits and transmitted to the decoder in addition to the azimuth angle $t_{opt}$ coded on $[\log_2 N_\theta]$ bits. In the example taken hereinabove, it will be possible to code $m_{opt}$ on 1 bit, and $t_{opt}$ on 4 bits.

In a variant, it will be possible to replace the model m=0 by an ITD table as a function of the azimuth arising from real measurements of HRTFs, without parametric law, but with ITD values estimated on the real data; in this case, the size $N_\theta(m)$ will be able to depend on the angular resolution used to measure HRTFs (assuming that no angular interpolation has been applied).

As in FIG. 4*a*, the coding of a cue in respect of correction of the value $ITD_{max}$ is optional, thus the block 312 is indicated dashed. When the bit budget allocated to the coding of $ITD_{max}$ is zero, the value of $ITD_{max}$ predefined in the representation model of the ITD will therefore be taken.

In a variant of the invention the representation model of the ITD could be generalized so as to reduce solely to the horizontal plane but also include the elevation. In this case, two angles are determined, the azimuth angle θ and the elevation angle φ.

The search for the two angles can be made according to the following equation:

$$(m_{opt}, t_{opt}, p_{opt}) = \underset{\substack{m=0,\ldots,N_M-1\\ t=0,\ldots,N_\theta(m)-1\\ p=0,\ldots,N_\varphi(m)-1}}{\operatorname{argmin}} (ITD - M_{ITD}(m,t,p))^2 \qquad (27)$$

with $N_\varphi(m)$ the number of elevation angles considered for the m-th model and $P_{opt}$ representing the elevation angle to be coded.

In the invention, one also seeks to reduce the coding bitrate of spatialization cues other than the ITD, such as the spatialization interchannel intensity difference (ILD) cue. It will be noted that the block 316 of FIG. 4*b* will be able to code and multiplex in various ways with a fixed- or variable-bitrate coding of the cues $m_{opt}$, $t_{opt}$, $P_{opt}$ thus $ITD_{max}$ as when the latter must be transmitted.

Thus, in the same way as for the ITD it is possible to resort to a parametrization of the ILD. In the binaural case, in accordance with the thesis of Jérôme Daniel, entitled "Représentation de champs acoustiques, application à la transmission et à la reproduction de scènes sonores complexes dans un contexte multimédia" [Representation of acoustic fields, application to the transmission and reproduction of complex sound scenes in a multimedia context], University of Paris 6, Jul. 2011, the ILD can also be approximated according to the following law:

$$ILD(r, \theta) = \frac{80\pi fr\sin(\theta)}{c\ln(10)} \qquad (29)$$

where f is the frequency, r the distance from the sound source and c the speed of sound.

By defining a relative ILD, $ILD_{max}$, it is possible under certain conditions to reduce this approximation to the equation:

$$ILD_{glob}(\theta)=ILD_{max}\sin(\theta) \qquad (30)$$

The above law is only an approximation corresponding to the global level of the HRTFs at a given azimuth; it does not make it possible to completely characterize the spectral coloration given by the HRTFs but it characterizes only their global level. The reference ILD can be defined—at a later time, when defining the ILD model, by taking a base of normalized signals or a base of HRTF filters—by taking the maximum of the total ILD of a binaural signal. In the invention it is considered that this sine law applies not only to the total (or global) ILD but also to the sub-band based ILD; in this case, the parameter $ILD_{max}$ depends on the index of the sub-band and the model becomes:

$$ILD[b](\theta)=ILD_{max[b]sin(\theta)} \qquad (31)$$

Figure 6A:
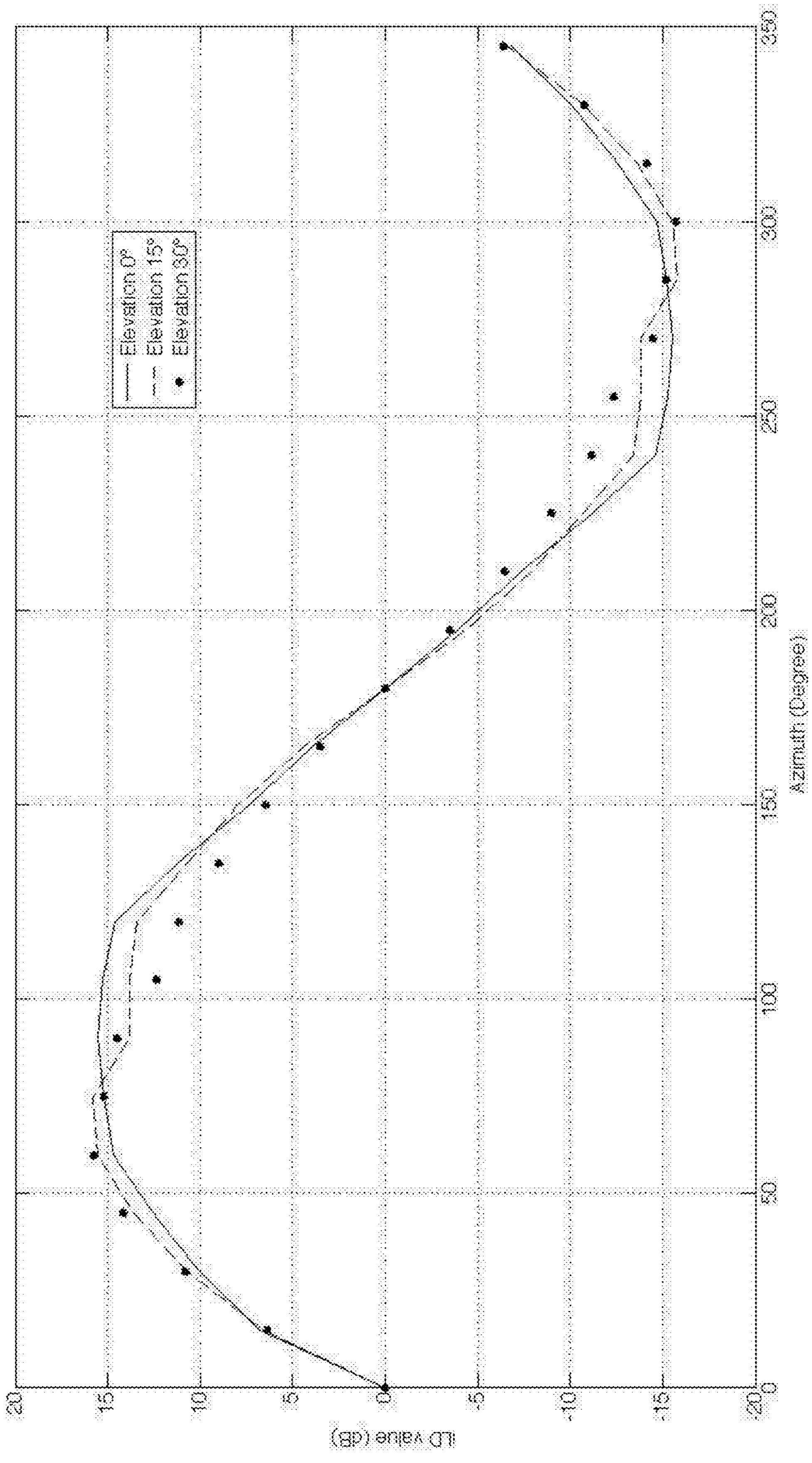
FIG. 6*a* illustrates representations of models of total energy of HRTFs suitable for representing spatial cues of ILD type.

Experimentally, it may be verified that if the energy (illustrated with reference to FIG. 6*a* for several elevation values φ) of the HRTF filters is calculated, it is apparent that the approximation of the global ILD (in the sense of difference in global level between channels) follows a sine law for the elevations represented φ=0°, 15° and 30°, as a function of azimuth θ.

It will be noted that even if the symmetry of the frontal half-plane (azimuth lying in [0, 180] degrees) and the half-plane at the rear of the head (azimuth lying in [180, 360] degrees) is in general not totally valid, this sine law is used in the invention to code and decode the ILD.

Just as for the case of the ITD where a value $ITD_{max}$ has been defined, it is therefore possible either to transmit the parameter $ILD_{max}$, or to use a predetermined and stored value $ILD_{max}$, so as to derive therefrom a value $ILD_{glob}(\theta)$ according to equation (30) and thus apply a global ILD, valid over the whole spectrum of the signal to obtain a rudimentary (global) location.

Figure 6B:
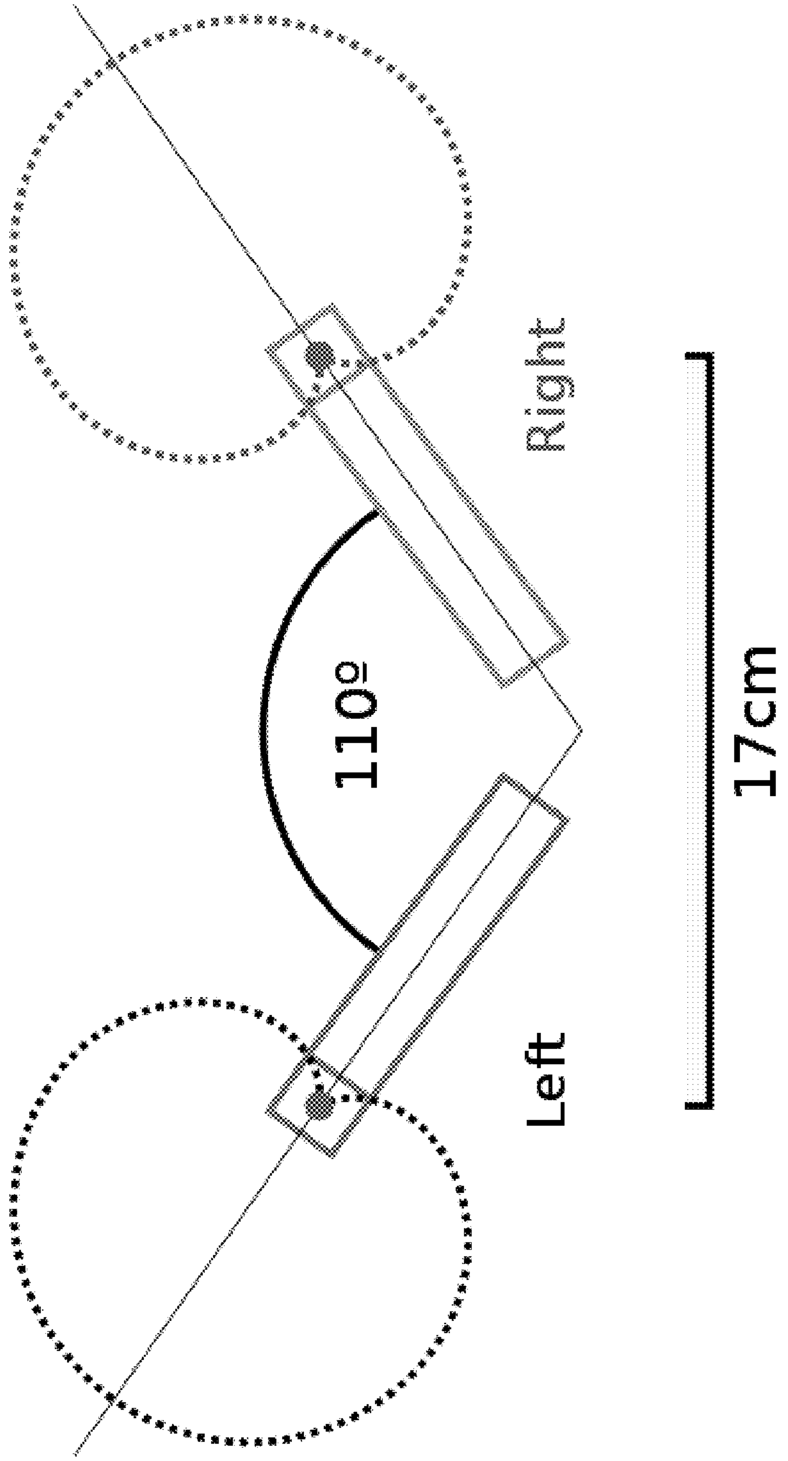
FIG. 6*b* illustrates a configuration of stereo microphones of ORTF type picking up an exemplary signal with two channels to be coded according to one embodiment of the coding method of the invention.
Figure 6C:
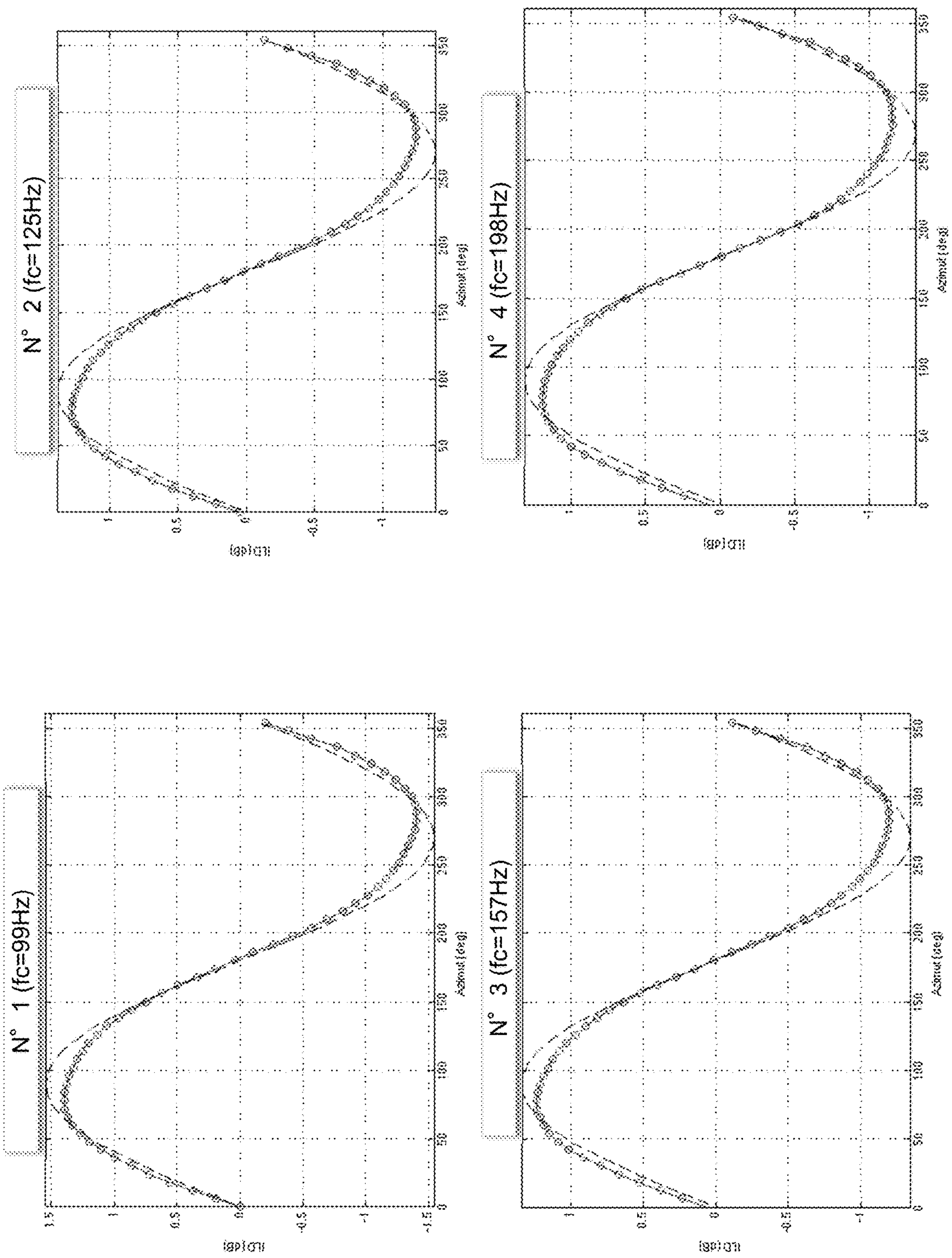
FIGS. 6*c* to 6*g* illustrate representations of a cue model $M_{ILD}(m, t)$ (for m=0 and t corresponding to an azimuth from 0 to 360°) of spatialization of ILD type by sub-bands in a 1/3 octave slicing, as a function of the azimuth angle.
Figure 6D:
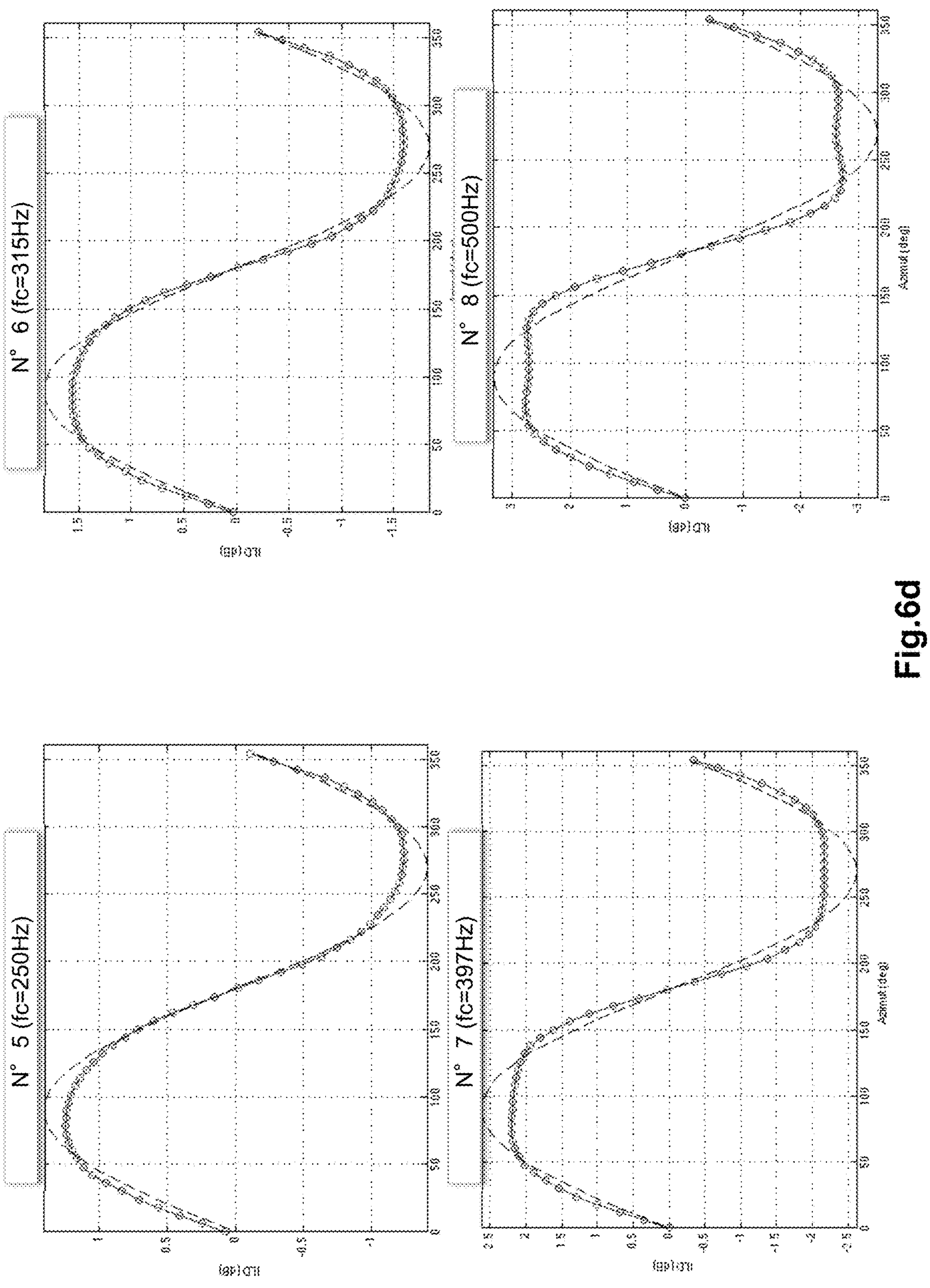
Figure 6E:
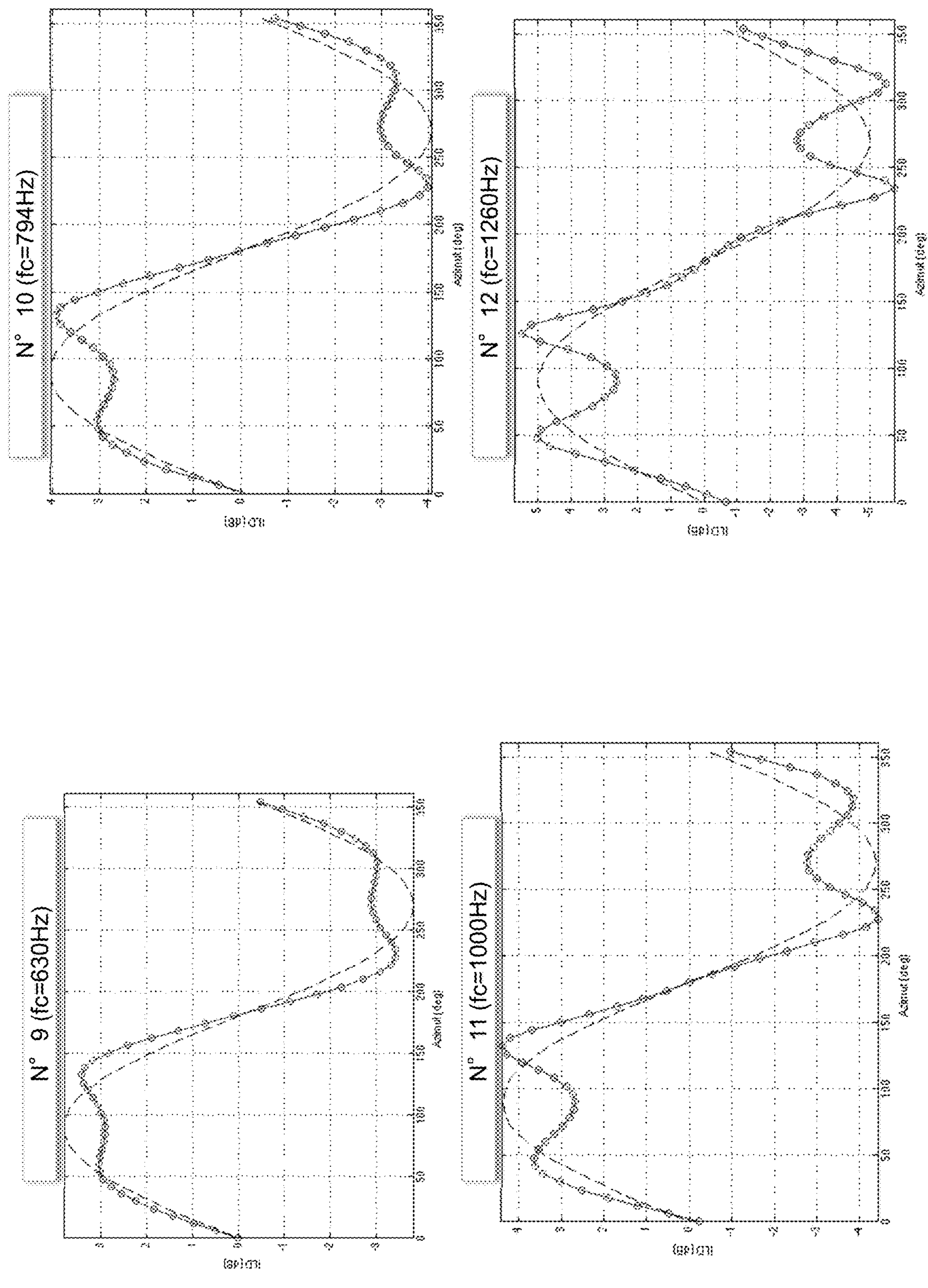
Figure 6F:
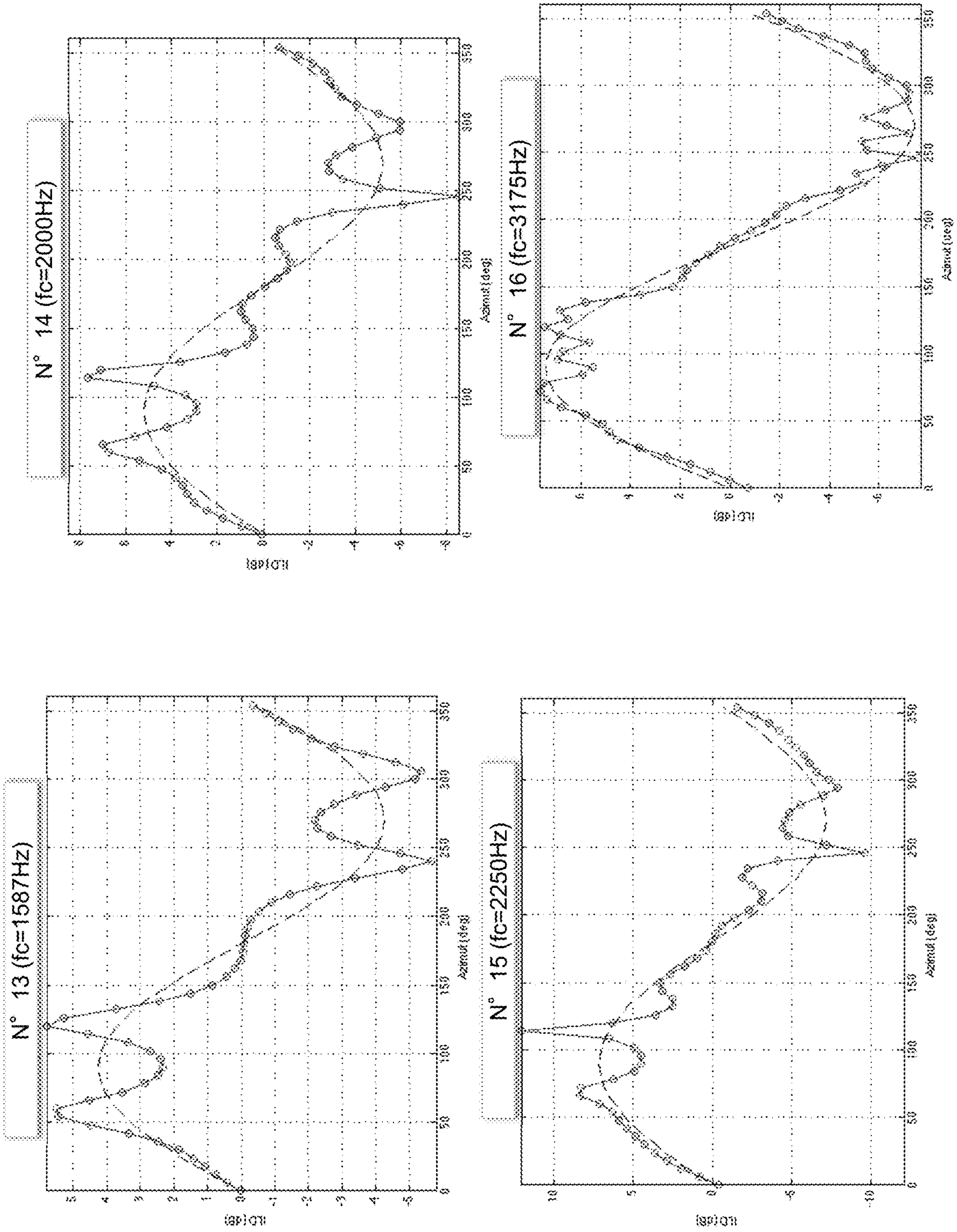
Figure 6G:
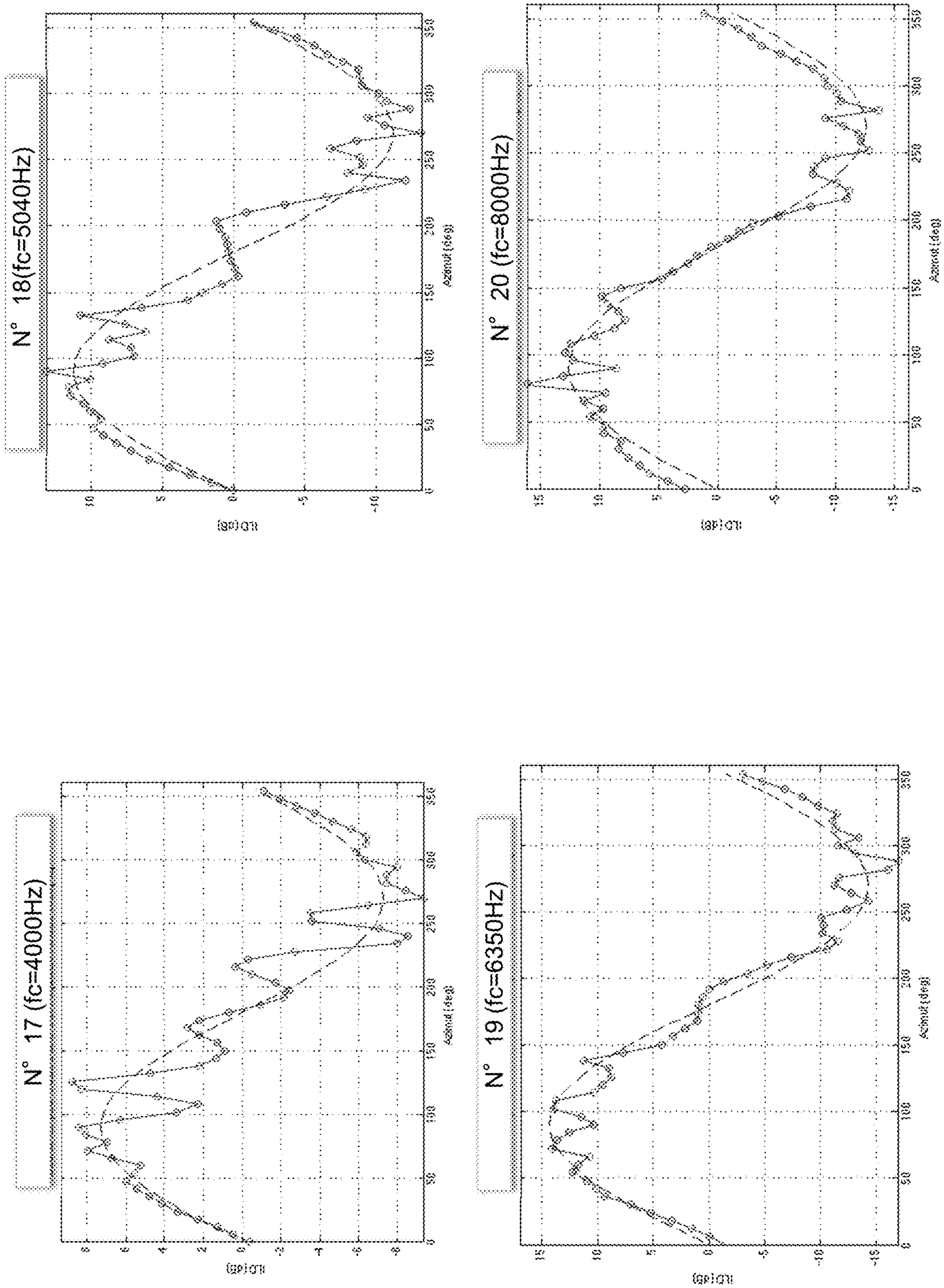

Another exemplary model relies on the configuration of ORTF stereo microphones which is illustrated in FIG. 6*b*.

In this example, the sub-band based ILD model could be defined in relation to a configuration of ORTF microphones as follows:

$$ILD(\theta)=L(\theta)-R(\theta)=a(\cos(\theta-\theta_0)-\cos(\theta+\theta_0)) \quad (32)$$

with $$L(\theta)=a(1+\cos(\theta-\theta_0)) \quad (33)$$

$$R(\theta)=a(1+\cos(1+\cos(\theta+\theta_0)) \quad (34)$$

where $\theta_0$ (in radians) corresponds to 55°.

This model can also be written in the form:

$$ILD(\theta)=L(\theta)-R(\theta)=a(\cos(\theta)\cos(\theta_0)+\sin(\theta)\sin(\theta_0)) \quad (35)$$

Here again it is possible to define a value $ILD_{max}$ which corresponds to:

$$ILD_{max=a} \quad (36)$$

Here again, it is assumed that the model defined in equation 35 applies not only to the case of a total (or global) ILD but also to the sub-band based ILD; in this case the parameter $ILD_{max}$ (or a proportional version) will be dependent on the sub-band in the form $ILD[b]_{max}$.

Thus, with reference to FIG. 4*a*, in the same way as for the cue ITD, the block 317 which receives an interchannel intensity difference (ILD) cue through the extraction module 314 comprises a module 420 for obtaining a representation model of the interchannel intensity difference (ILD) cue.

This model is for example the model such as defined hereinabove in equation (30) or with other models described in this document.

The angle parameter θ already defined at 411 can be reused at the decoder to retrieve the global ILD or the sub-band based ILD such as defined by equation (30), (31) or (35); this in fact makes it possible to "pool" the coding of the ITD and of the ILD. In the case where the value $ILD_{max}$ is not fixed, the latter is determined at 423 and coded.

In a particular embodiment, a module 421 for estimating an interchannel intensity difference cue is implemented on the basis on the one hand of the angle parameter obtained by the block 411 in order to code the time shift cue (ITD) and on the other hand of the representation model of equation (30), (31) or (35). In an optional manner, the module 422 calculates a residual of the cue ILD, that is to say the difference between the cue in respect of real interchannel intensity difference (ILD) extracted at 314 and the interchannel intensity difference (ILD) cue estimated at 421 on the basis of the ILD model.

This residual can be coded at 318 for example by a conventional scalar quantization scheme. However, in contradistinction to the coding of a direct ILD, the quantization table may be for example limited to a dynamic range of +/−12 dB with a step size of 3 dB.

This ILD residual makes it possible to improve the quality of decoding of the cue ILD in the case where the ILD model is too specific and applies only to the signal to be coded in the current frame; it is recalled that a classification may optionally be used at the coder to avoid such cases, however in the general case it may be useful to code an ILD residual.

Thus, the coding of these parameters as well as that of angle of the ITD makes it possible to retrieve at the decoder the interchannel intensity difference (ILD) cue of the binaural audio signal with a good quality.

In the same way as for the ITD, the spatialization cue (global or sub-band based) will therefore be retrieved on decoding by applying the same representation model and by decoding if relevant the residual parameter and reference ILD parameter. The bitrate necessary for coding these parameters is lower than if the cue ILD itself were coded, in particular when the ILD residual does not have to be transmitted and when use is made of the parameter or parameters $ILD_{max}$ predefined in the ILD model or models. Thus, the coding of this spatialization cue (ILD) consumes little bitrate.

This ILD model using only a global ILD value is however very simplistic since in general the ILD is defined on several sub-bands.

In the coder described previously, B sub-bands according to a 1/3 octave slicing or according to the ERB scale were defined. To make it possible to represent more than one parameter of total (or global) ILD the representation model of the ILD is therefore extended to several sub-bands. This extension applies to the invention described in FIG. 4*a*, however the associated description is given hereinafter in the context of FIG. 4*b* to avoid too much redundancy. The model is dependent on the angle θ and optionally on the elevation; this model may be the same in all the sub-bands, or vary according to the sub-bands.

We consider the variant embodiment described in FIG. 4*b* for the coding of the ILD. Just as for the ITD, in this variant we define representation models of the ILD. The model such as defined for the interchannel intensity difference (ILD) cue is not fixed but is parametrizable. The model is defined by a value $ILD_{max}$ and an angle parameter. In the general case, on the basis of an ILD models table obtained at 440, we determine a model index $m_{opt}$ and an angle index to be coded at 442 according to the following equation:

$$(m_{opt}, t_{opt}) = \operatorname{argmin}_{\substack{m=0, \ldots, N_M-1 \\ t=0, \ldots, N_\theta(m)-1}} \operatorname{dist}(ITD, M_{ITD}(m, t)) \quad (37)$$

where $N_M$ is the number of models in the ILD models table, $N_\theta(m)$ is the number of azimuth angles considered for the m−th model, $M_{ILD}(m, t)$ corresponds to a precise value of the cue ILD and dist(. , .) is a criterion of distance between ILD vectors.

However, in a variant embodiment, this search could be simplified by using the angle cue already obtained in the block 432 for the ITD model. It will be noted that the values t=0, . . . , $N_\theta(m)-1$ for the ILD model do not necessarily correspond to the same set of values as for the ITD model, however it is advantageous to harmonize these sets so as to have coherence between representation models for the ILD and the ITD.

The following may for example be taken as possible distance criteria:

$$\operatorname{dist}(X,Y)=|\Sigma_{b=0}^{B-1}X[b]-\Sigma_{b=0B-1Y[b]}|^q \quad (38)$$

where q=1 or 2.

An exemplary ILD model is illustrated in FIGS. 6*c* to 6*g* for several frequency bands. We do not give here the corresponding values (in dB) in the form of arrays so as not to overburden the text, approximate values could be derived from the graphs of FIGS. 6*c* to 6*g*. This figure considers the case of a 1/3 octave slicing already defined previously. Thus each figure represents the ILD for the frequency band defined by the octave-third number defined in the array 1 hereinabove with a band-dependent central frequency fc. Each point marked with a circle in each sub-figure corresponds to a value $M_{ILD}(m, t)$; in addition to defining the ILD table associated with the model we have also shown the sine law scaled by a predefined parameter $ILD_{max}$ dependent on the sub-band.

In a variant of the invention the representation model of the ILD could be generalized so as not to reduce solely to the horizontal plane but also to include the elevation. In this case, the search for two angles becomes:

$$(m_{opt}, t_{opt}, p_{opt}) = \operatorname{argmin}_{\substack{m=0, \ldots, N_M-1 \\ t=0, \ldots, N_\theta(m)-1 \\ p=0, \ldots, N_\varphi(m)-1}} \operatorname{dist}(ILD, M_{ITD}(m, t, p)) \tag{39}$$

with $N_\varphi(m)$ the number of elevation angles considered for the m-th model and $p_{opt}$ representing the elevation angle to be coded.

In a variant, an exemplary model $M_{ILD}(m, t, p)$ can be obtained on the basis of a suite of HRTFs in the following manner. Given the HRTF filters for θ and φ, it is possible to:

calculate the ILDs per sub-band between left and right channels per sub-band optionally normalize the ILDs store the ILDs and determine the value of $ILD_{max}$ in each sub-band so as to adjust an expansion factor for the ILDs The multidimensional table $M_{ILD}(m, t, p)$ can be seen as a directivity model referred to the domain of the ILD.

An index of the selected law $m_{opt}$ is then coded and transmitted to the decoder at 318.

In the same way as for FIG. 4*a*, an ILD residual could be calculated (blocks 421 and 422) and coded.

Hitherto separate models have been considered for the ITD and the ILD, even if it was noted that the determination of the angle may be "pooled". For example, the azimuth may be determined by using the ITD model and this same angle is used directly for the ILD model. Another variant embodiment calling upon a (joint) "integrated model" is now considered. This variant is described in FIG. 4*c*.

In this variant, rather than having separate models for the ITD and the ILD ($M_{ITD}(m, t, p)$ and $M_{ILD}(m, t, p)$) it will be possible to define a joint model in the block 450: $M_{ITD,ILD}(m, t, p)$ whose inputs comprise candidate values of ITD and of ILD; thus, for various discrete values representing θ and φ "vectors" (ITD, ILD) are defined. In this case, the distance measurement used for the search must combine the distance on the ITD and the distance on the ILD, however it is still possible to perform a separate search.

Thus, an index of the selected law $m_{opt}$, of the azimuth angle $t_{opt}$ and of the elevation angle $P_{opt}$ that are determined at 453, are coded at 331 and transmitted to the decoder. Just as for FIGS. 4*a* and 4*b*, the parameters $ITD_{max}$, $ILD_{max}$ and the ILD residual can be determined and coded.

Figure 4C:
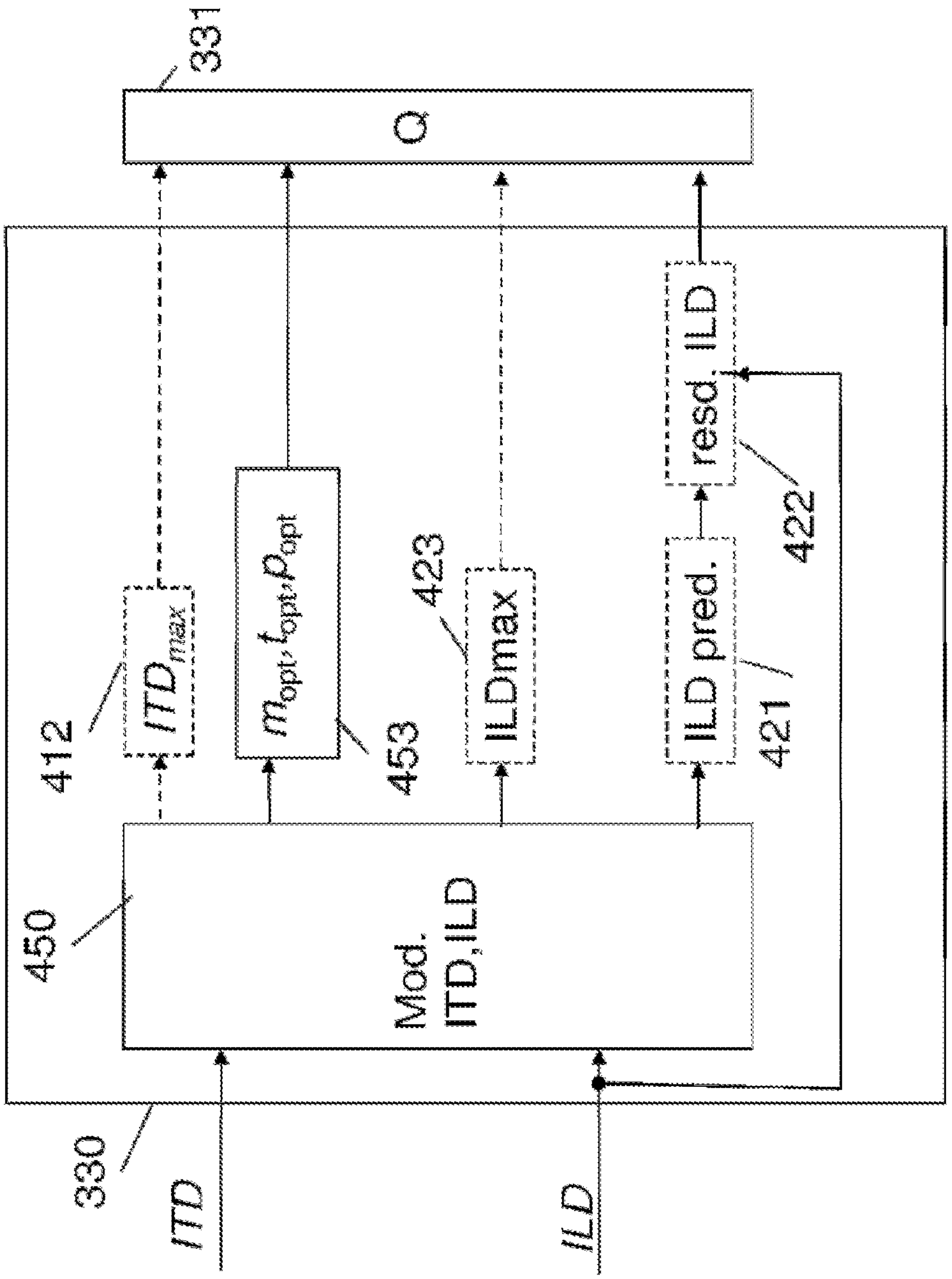
Figure 8:
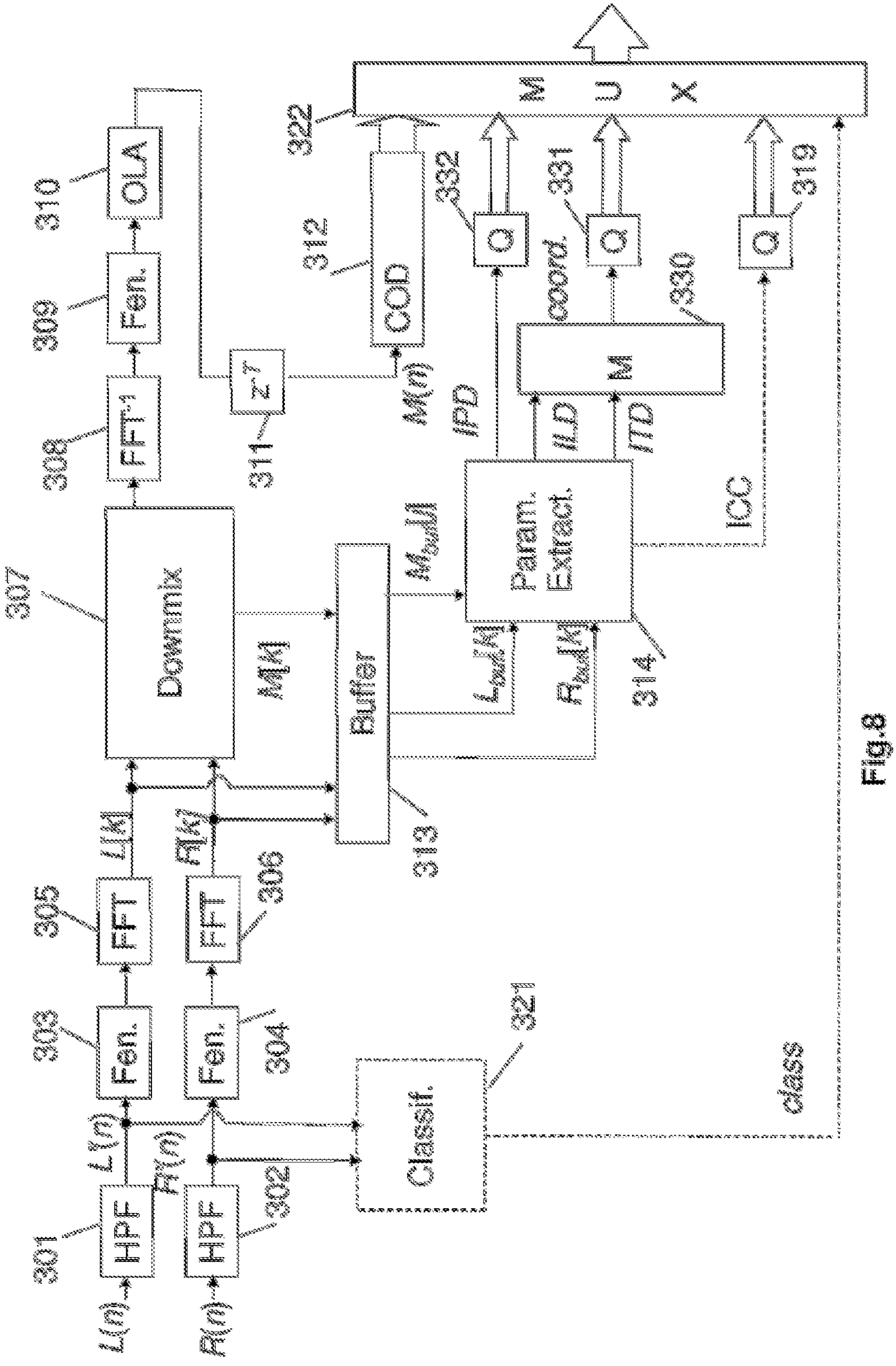
FIG. 8 illustrates a variant embodiment of a parametric coder according to the invention.

A variant of the coder illustrated in FIG. 3 implementing the joint model of FIG. 4*c* is illustrated in FIG. 8. It will be noted that in this coder variant the parameters ITD and ICC are estimated in the block 314. Moreover, here we consider the general case where IPD parameters are also extracted and coded in the block 332. The blocks 330 and 331 correspond to the blocks indicated and detailed in FIG. 4*c*.

Figure 7:
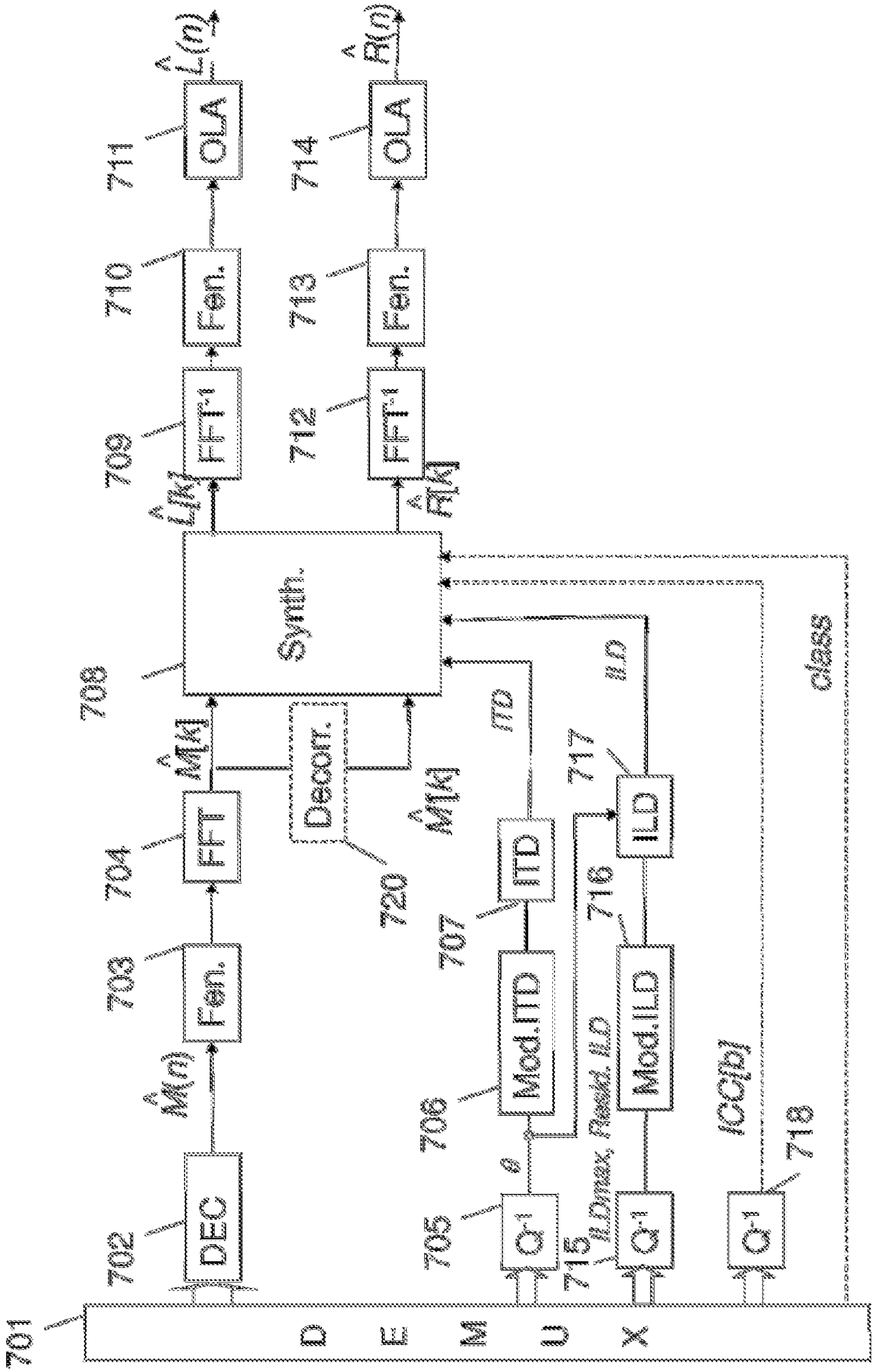
FIG. 7 illustrates a parametric decoder as well as the decoding method according to one embodiment of the invention.

With reference to FIG. 7 a decoder according to one embodiment of the invention is now described.

This decoder comprises a demultiplexer 701 in which the coded mono signal is extracted so as to be decoded at 702 by a mono EVS decoder (according to the specifications 3GPP TS 26.442 or TS 26.443) in this example. The part of the binary train corresponding to the mono EVS coder is decoded according to the bitrate used at the coder. It is assumed here that there is no loss of frames nor any binary errors in the binary train to simplify the description, however known techniques for correcting loss of frames can quite obviously be implemented in the decoder.

The decoded mono signal corresponds to $\hat{M}(n)$ in the absence of channel errors. An analysis by short-term discrete Fourier transform with the same windowing as at the coder is carried out on $\hat{M}(n)$ (blocks 703 and 704) to obtain the spectrum $\hat{M}[k]$. It is considered here that a decorrelation in the frequency domain (block 720) is also applied. This decorrelation could also have been applied in the time domain.

The details of implementation of the block 708 for the synthesis of the stereo signal are not presented here since they lie outside the scope of the invention, but the conventional synthesis techniques known from the prior art could be used.

In the synthesis block 708, it is for example possible to reconstruct a signal with two channels with the following processing on the mono signal decoded and transformed into frequencies:

$$\hat{L}[k] = c_{1\hat{M}[k]} \tag{40}$$

$$\hat{R}[k] = c_{2\hat{M}[k]e}^{-j2\pi kITD/NFFT} \tag{41}$$

where $c = 10^{ILD[b]/10}$ (with b the index of the sub-band containing the spectral line of index k), $$c_1 = \sqrt{\frac{2c}{1+c}}, \text{ and} \tag{42}$$

$$c_2 = \sqrt{\frac{2}{1+c}}, \tag{43}$$

ITD is the ITD decoded for the spectral line k (if a single ITD is coded, this value is identical for the various spectral lines of index k) and NFFT is the length of the FFT and of the inverse FFT (blocks 704, 709, 712).

It is also possible to take into account the parameter ICC decoded at 718 to recreate a non-localized sound ambience (background noise) to improve the quality.

The spectra $\hat{L}[k]$ and $\hat{R}[k]$ are thus calculated and thereafter converted into the time domain by inverse FFT, windowing, addition and overlap (blocks 709 to 714) to obtain the synthesized channels $\hat{L}(n)$ and $\hat{R}(n)$.

The parameters which have been coded to obtain the spatialization cues are decoded at 705, 715 and 718.

At 718, it is the cues $ICC^q[b]$ which are decoded if, however, they have been coded.

At 705, it is the angle parameter θ which is decoded, optionally with a value $ITD_{max}$. On the basis of this parameter, the module 706 for obtaining a representation model of an interchannel time shift cue is implemented to obtain this model. Just as for the coder, this model can be defined by equation (15) defined hereinabove. Thus, on the basis of this model and of the decoded angle parameter, it is possible for the module 707 to determine the interchannel time shift (ITD) cue in respect of the multichannel signal.

If at the decoder an angle per frequency or per frequency band is coded, then these various angles per frequency or frequency bands are decoded to define the cues ITD per frequency or frequency bands.

In the same way, in the case where parameters making it possible to code the interchannel intensity difference (ILD) cue are coded, they are decoded by the module for decoding these parameters at 715, at the decoder.

Thus, the residual parameter (Resid. ILD) and reference ILD parameter ($ILD_{max}$) are decoded at 715.

On the basis of these parameters, the module 716 for obtaining a representation model of an interchannel intensity difference cue is implemented to obtain this model. Just as for the coder, this model can be defined by equation (30) defined hereinabove.

Thus, on the basis of this model, of the ILD residual parameters (that is to say the difference between the cue in respect of real interchannel intensity difference (ILD) and the interchannel intensity difference (ILD) cue estimated with the model), of the reference ILD parameter ($ILD_{max}$) and of the angle parameter decoded at 705 for the cue ITD, it is possible for the module 717 to determine the interchannel intensity difference (ILD) cue of the multichannel signal.

If at the coder the ILD coding parameters were itemized by frequency band, then these various frequency band based parameters are decoded to define the cues ILD per frequency or frequency bands.

It will be noted that the decoder of FIG. 7 is relevant to the coder of FIG. 4*a*. It will be understood that if the coding according to the invention is done according to FIG. 4*b* or 4*c*, the decoder will be modified accordingly to decode, in particular, indices of models and of angles in the form $m_{opt}$, $t_{opt}$, $P_{opt}$ and to reconstruct the values of ITD and of ILD as a function of the model used and indices associated with reconstruction values.

Figure 9:
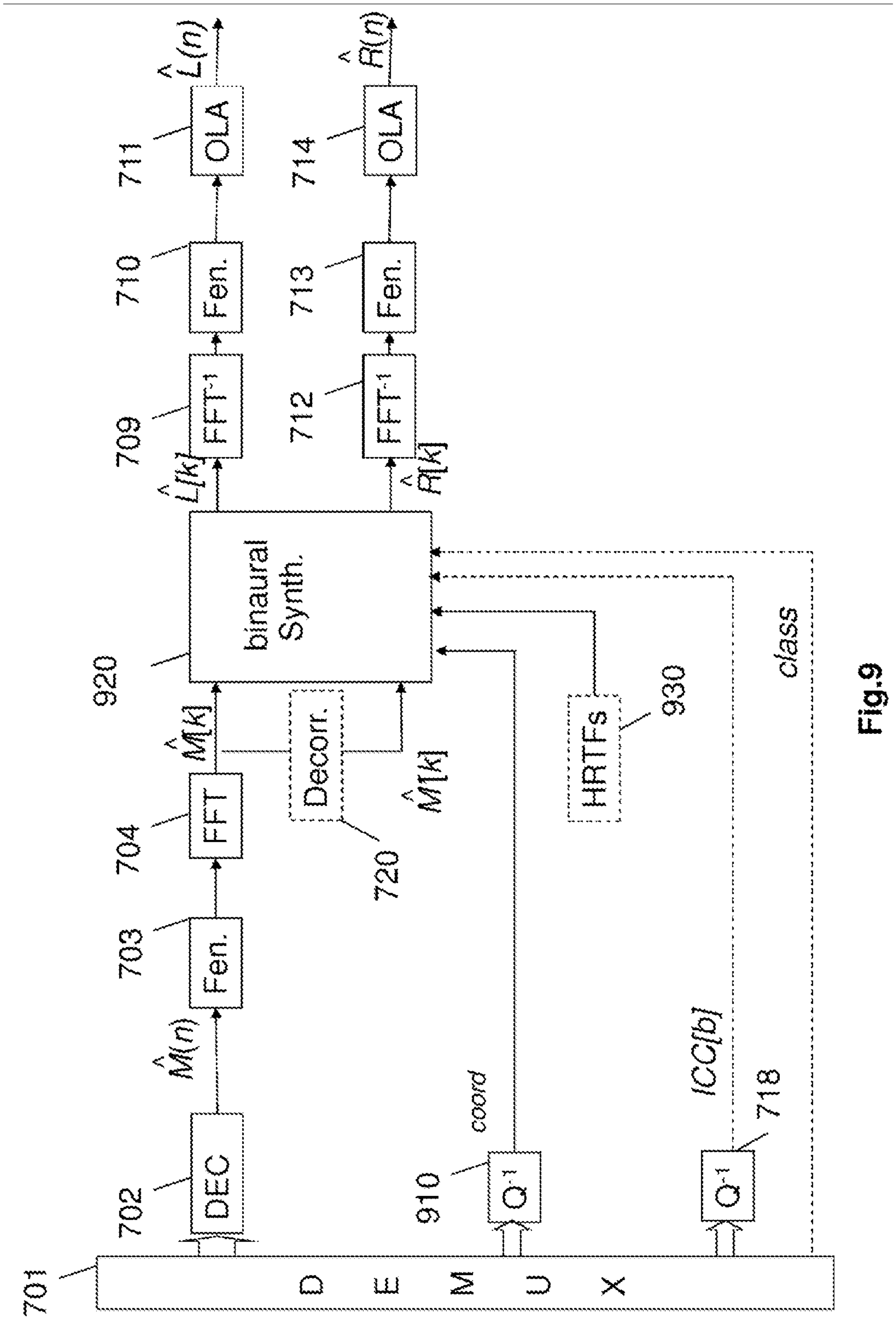
FIG. 9 illustrates a variant embodiment of a parametric decoder according to the invention.

In a variant of the invention the decoder of FIG. 7 is thus modified as illustrated in FIG. 9. In this variant, the decoded ILD and ITD parameters are not reconstructed directly. The stereo synthesis (block 708) is replaced with a binaural synthesis (block 920). Thus the decoding of the cues ILD and ITD reduces to a decoding (block 910) of the angular coordinates. By using a predefined basis of HRTFs (block 930) it is therefore possible to decode a binaural signal rather than a stereo signal. In variants, it will be possible to apply the HRTF filters in the time domain.

The coder presented with reference to FIG. 3 and the decoder presented with reference to FIG. 7 have been described in the case of particular application of stereo coding and decoding. The invention has been described on the basis of a decomposition of the stereo channels by discrete Fourier transform. The invention also applies to other complex representations, such as for example the MCLT (Modulated Complex Lapped Transform) decomposition combining a modified discrete cosine transform (MDCT) and modified discrete sine transform (MDST), as well as in the case of banks of filters of Pseudo-Quadrature Mirror Filter (PQMF) type. Thus the term "frequency spectral line" used in the detailed description can be extended to the notion of "sub-band" or of "frequency band", without changing the nature of the invention.

The coders and decoders such as described with reference to FIGS. 3 and 7 can be integrated into multimedia equipment of lounge decoder, "set top box" or audio or video content reader type. They can also be integrated into communication equipment of mobile telephone or communication gateway type.

Figure 10:
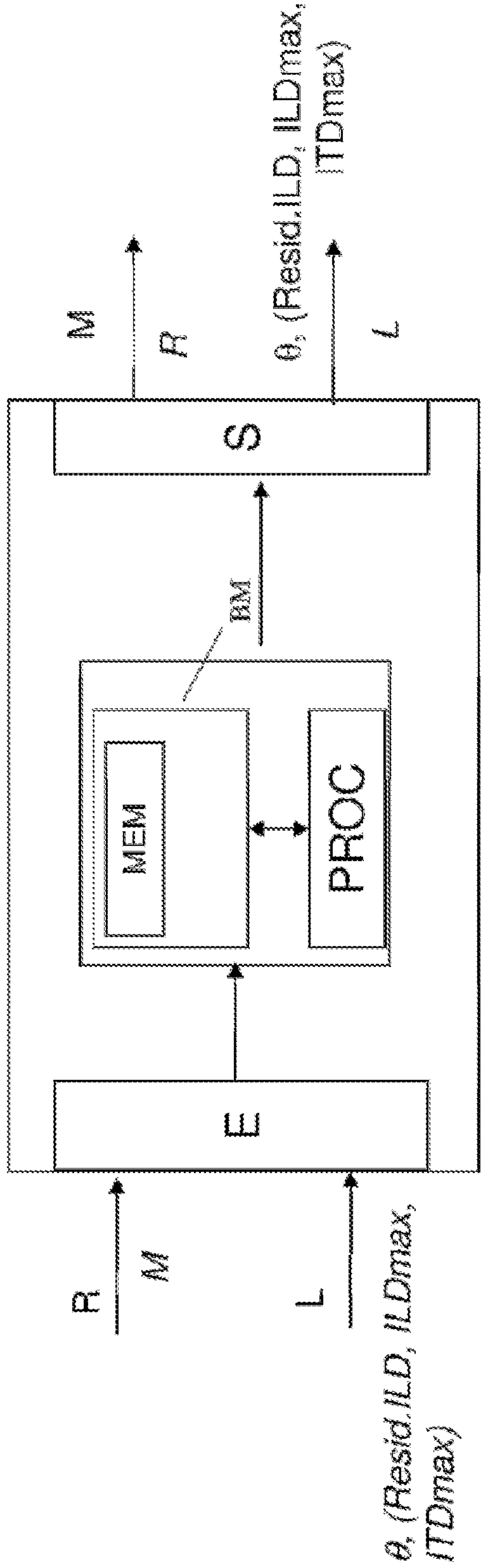
FIG. 10 illustrates a hardware example of an item of equipment incorporating a coder able to implement the coding method according to one embodiment of the invention or a decoder able to implement the decoding method according to one embodiment of the invention.

FIG. 10 represents an exemplary embodiment of such an item of equipment in which a coder such as described with reference to FIGS. 3, 8 and 4*a* to 4*c* or a decoder such as described with reference to FIG. 7 or 9, according to the invention is integrated. This device comprises a processor PROC cooperating with a memory block BM comprising a storage and/or work memory MEM.

In the case of a coder, the memory block can advantageously comprise a computer program comprising code instructions for the implementation of the steps of the coding method in the sense of the invention, when these instructions are executed by the processor PROC, and in particular the steps of extracting a plurality of spatialization cues in respect of the multichannel signal, of obtaining at least one representation model of the spatialization cues extracted, of determining at least one angle parameter of a model obtained and of coding the at least one angle parameter determined so as to code the spatialization cues extracted during the coding of spatialization cues.

In the case of a decoder, the memory block can advantageously comprise a computer program comprising code instructions for the implementation of the steps of the decoding method in the sense of the invention, when these instructions are executed by the processor PROC, and in particular the steps of receiving and decoding at least one coded angle parameter, of obtaining at least one representation model of spatialization cues and of determining a plurality of spatialization cues in respect of the multichannel signal on the basis of the at least one model obtained and of the at least one decoded angle parameter.

The memory MEM can store the representation model or models of various spatialization cues which are used in the coding and decoding methods according to the invention.

Typically, the descriptions of FIGS. 3, 4 on the one hand and 7 on the other hand repeat the steps of an algorithm of such a computer program respectively for the coder and for the decoder. The computer program can also be stored on a memory medium readable by a reader of the device or item of equipment or downloadable into the memory space of the latter.

Such an item of equipment in the guise of coder comprises an input module able to receive a multichannel signal for example a binaural signal comprising the channels R and L for right and left, either through a communication network, or by reading a content stored on a storage medium. This multimedia equipment item can also comprise means for capturing such a binaural signal.

The device in the guise of coder comprises an output module able to transmit a mono signal M arising from a channels reduction processing and at the minimum, an angle parameter θ making it possible to apply a representation model of a spatialization cue so as to retrieve this spatial cue. If relevant, other parameters such as the ILD residual, ILD or reference ITD (ILDmax or ITDmax) parameters are also transmitted via the output module.

Such an item of equipment in the guise of decoder comprises an input module able to receive a mono signal M arising from a channels reduction processing and at the minimum an angle parameter θ making it possible to apply a representation model of the spatialization cue so as to retrieve this spatial cue. If relevant, to retrieve the spatialization cue, other parameters such as the ILD residual, ILD or reference ITD (ILDmax or ITDmax) parameters are also received via the input module E.

The device in the guise of decoder comprises an output module able to transmit a multichannel signal for example a binaural signal comprising the channels R and L for right and left.

Although the present disclosure has been described with reference to one or more examples, workers skilled in the art will recognize that changes may be made in form and detail without departing from the scope of the disclosure and/or the appended claims.

The invention claimed is:

1. A method comprising:

parametric coding a multichannel digital audio signal comprising the following acts performed by a coding device:

coding a signal arising from a channels reduction processing applied to the multichannel signal;

coding spatialization cues in respect of the multichannel signal, which comprises:

extracting a plurality of spatialization cues in respect of the multichannel signal;

obtaining at least one representation model of the spatialization cues extracted;

determining at least one angle parameter of a model obtained; and coding of the at least one determined angle parameter so as to code the spatialization cues extracted during the coding of spatialization cues; and transmitting the coded signal and the coded at least one determined angle parameter on a communication network or storing the coded signal and the coded at least one determined angle parameter in a non-transitory computer-readable medium.

2. The coding method as claimed in claim 1, wherein the spatialization cues are defined by frequency sub-bands of the multichannel audio signal and at least one angle parameter per sub-band is determined and coded.

3. The method as claimed in claim 1, wherein the method furthermore comprises calculating a reference spatialization cue and coding this reference spatialization cue.

4. The coding method as claimed in claim 1, wherein one of the spatialization cues is an interchannel time shift (ITD) cue.

5. The coding method as claimed in claim 1, wherein one of the spatialization cues is an interchannel intensity difference (ILD) cue.

6. The method as claimed in claim 5, wherein the method furthermore comprises the following acts for coding an interchannel intensity difference cue:

estimating an interchannel intensity difference cue on the basis of the model obtained and of the angle parameter determined;

coding the difference between the interchannel intensity difference cue extracted and estimated.

7. The method as claimed in claim 1, wherein a spatialization-cue-based representation model is obtained.

8. The method as claimed in claim 1, wherein a representation model common to several spatialization cues is obtained.

9. The coding method as claimed in claim 1, wherein the act of obtaining of a representation model of the spatialization cues is performed by selecting from a table of models defined for various values of the spatialization cues.

10. The method as claimed in claim 9, wherein an index of the table corresponding to the selected model is coded.

11. A parametric coder of a multichannel digital audio signal, comprising:

a processor; and a non-transitory computer-readable medium comprising instructions stored thereon, which when executed by the processor configure the parametric coder to perform acts to parametric code the multichannel digital audio signal:

coding a signal arising from a channels reduction processing applied to the multichannel signal;

coding spatialization cues in respect of the multichannel signal, which comprises:

extracting a plurality of spatialization cues in respect of the multichannel signal;

obtaining at least one representation model of the spatialization cues extracted;

determining at least one angle parameter of a model obtained; and coding the at least one determined angle parameter so as to code the spatialization cues extracted during the coding of spatialization cues; and transmitting the coded signal and the coded at least one determined angle parameter on a communication network or storing the coded signal and the coded at least one determined angle parameter in a storage medium.

12. A non-transitory computer-readable medium on which is recorded a computer program comprising code instructions for execution of a method of parametric coding a multichannel digital audio signal when the instructions are executed by a processor of a coding device, wherein the method comprises:

coding a signal arising from a channels reduction processing applied to the multichannel signal;

coding spatialization cues in respect of the multichannel signal, which comprises:

extracting a plurality of spatialization cues in respect of the multichannel signal;

obtaining at least one representation model of the spatialization cues extracted;

determining at least one angle parameter of a model obtained; and coding the at least one determined angle parameter so as to code the spatialization cues extracted during the coding of spatialization cues; and transmitting the coded signal and the coded at least one determined angle parameter on a communication network or storing the coded signal and the coded at least one determined angle parameter in a storage medium.

* * * * *